United States Patent [19]

Goto

[11] Patent Number: 5,206,937
[45] Date of Patent: Apr. 27, 1993

[54] DATA COMMUNICATION SYSTEM HAVING PLURAL STATIONS CONNECTED TO A SINGLE TRANSMISSION PATH

[75] Inventor: Takeshi Goto, Hirakata, Japan

[73] Assignee: Matsushita Electric Industrial Co., Ltd., Osaka, Japan

[21] Appl. No.: 561,503

[22] Filed: Aug. 1, 1990

[30] Foreign Application Priority Data

Aug. 4, 1989 [JP] Japan ................... 1-203308

[51] Int. Cl.$^5$ .................................. G06F 13/38
[52] U.S. Cl. ........................ 395/325; 364/DIG. 1; 364/240.1; 364/230.4; 364/229.2
[58] Field of Search ................ 364/DIG. 1, DIG. 2; 395/200, 325

[56] References Cited

U.S. PATENT DOCUMENTS

| | | | |
|---|---|---|---|
| 3,812,465 | 5/1974 | Mann | 364/DIG. 2 |
| 4,322,793 | 3/1982 | Andersson et al. | 364/DIG. 1 |
| 4,373,183 | 2/1983 | Means et al. | 364/DIG. 1 |
| 4,835,674 | 5/1989 | Collins et al. | 364/DIG. 1 |
| 4,858,112 | 8/1989 | Puerzer et al. | 364/DIG. 1 |

FOREIGN PATENT DOCUMENTS 2069734  8/1981  United Kingdom .

Primary Examiner—Thomas M. Heckler
Attorney, Agent, or Firm—Wenderoth, Lind & Ponack

[57] ABSTRACT

A data management method controls the transfer of data in a communication system in which a plurality of stations are coupled to a same data transmission path. Each of the stations operates in one of a master mode and a slave mode. In the master mode, a station transmits a frame of data on the data transmission path, the frame of data including an address designating a station which is to operate in the slave mode and a command designating functions to be carried out by the station designated to operate in the slave mode. In the slave mode, a station receives the frame of data transmitted by the station operating in the master mode, and carries out data processing in accordance with the command contained in the thus received frame of data.

4 Claims, 21 Drawing Sheets

Fig. 4 (II)

(c) Property data transfer request (polling) frame

| Transfer req. command | Device address | Sub-device address | Property data address |
|---|---|---|---|

330

(d) Property data content transfer frame

| Transfer command | Device address | Sub-device address | Property data address | Property data content 1 | ... | Property data content N |
|---|---|---|---|---|---|---|

340

No equivl. prop. data command

(a) Property data registration request frame (i) Reg. request | Reg. req. command | Sub-device address | Property data address | Property data no. of bytes
800

(ii) Affirm. resp. | Reg. compl. command
801

(iii) Neg. resp. | Reg. impos. command
802

(b) Property data renewal frame

| Renewal command | Sub-device address | Property data address | Property data content 1 | ... | Property data content N |

810

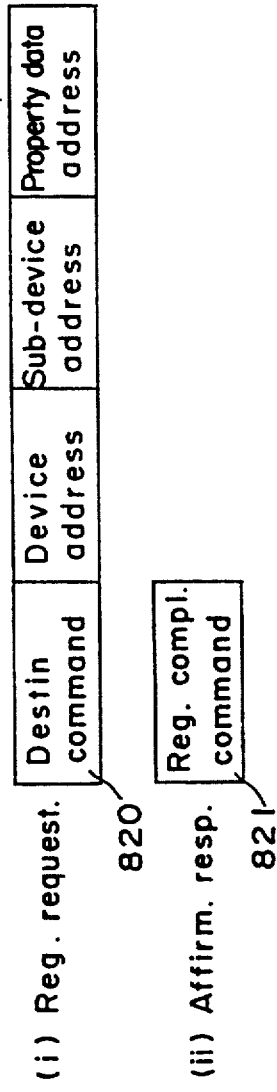
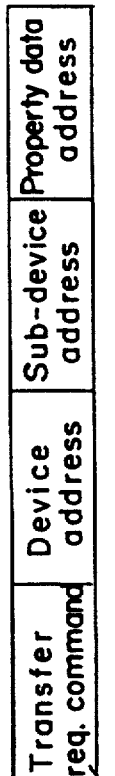
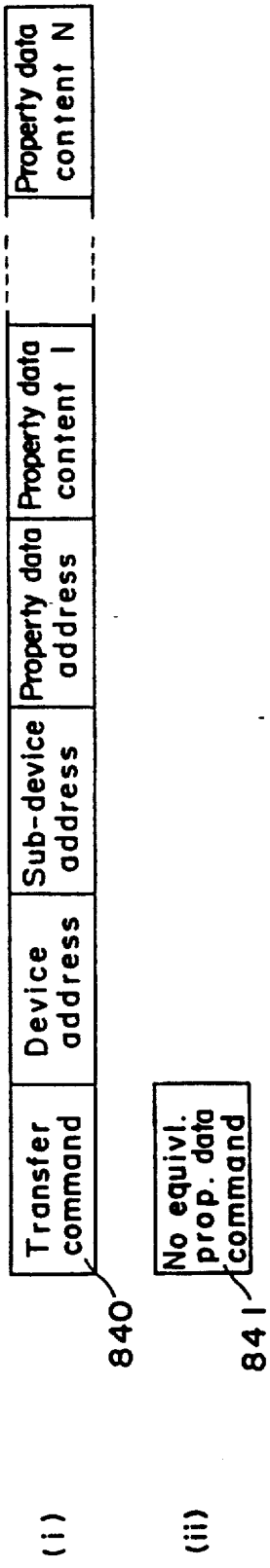
Fig. 10 (II)

DATA COMMUNICATION SYSTEM HAVING PLURAL STATIONS CONNECTED TO A SINGLE TRANSMISSION PATH

BACKGROUND OF THE INVENTION

The present invention generally relates to a data communication system, and more particularly, to a method of managing property data (inherent data or attribute data) of a plurality of stations (mainly audio/video appliances) connected by an information transmission passage.

Conventionally, when data communication appliances are connected to an information communication system, the respective stations independently store and manage the property data possessed thereby, and when data is to be transferred from one station to another, the following processes are employed.

(A) Station 2 sends a property data transfer request command to Station 1, and Station 1 transfers to Station 2, the equivalent property data with respect to said command.

(B) In the case where some state variation has taken place in Station 1, Station 1 notifies all other Stations of the equivalent property data through employment of a simultaneous same report frame.

(C) When some state variation has taken place in Station 1, the content of the registered property data is transferred with respect to Stations (e.g. Stations 2 and 3) preliminarily registered in Station 1.

However, in the conventional techniques as referred to above, there have been problems as stated hereinbelow.

(i) If the above practice (A) is employed, it is difficult for Station 2 to detect in real time that the content of the property data of Station 1 has been renewed.

(ii) In the case where there are many Stations which require the property data of Station 1, the amount of processing to be effected by Station 1 is undesirably increased.

(iii) when the above practice (B) is employed, since the simultaneous same report frame is employed, responses from all Stations other than Station 1 do not enter Station 1, thus resulting in a state of effluence of property data and insufficient communication reliability, and thus, if the simultaneous same report frame is not defined for the use of the communication system, this practice can not be adopted.

(iv) If the above practice (C) is employed, many memory areas are required within Station 1, together with a simultaneous increase in the processing amount of Station 1.

SUMMARY OF THE INVENTION

Accordingly, an essential object of the present invention is to provide an information communication system and a property data managing method in which the processing required for each station is reduced, and transfer of property data possessed by respective stations is smoothly effected, to thereby realize a highly reliable information communication system having a function equal to that of a simultaneous same report frame without employment of such a frame.

Another object of the present invention is to provide a property data managing method as described above, which entails simple processing steps and is readily incorporated in the information communication system for efficient operation.

In accomplishing these and other objects, in a first property data managing method of the present invention, the property data which each station wishes to manage is first registered, and by renewing the content of the property data as needed, the property data of a plurality of stations are concentratedly managed at one place.

More specifically, in the first aspect of the present invention, steps for a property data managing method are arranged as follows.

In an information communication system which includes one system of an information transmission path for effecting data communication, and a plurality of stations connected with said information transmission path, a property data managing method includes the steps of judging command contents of frame data transmitted in successive frames through said information transmission path from said plurality of stations, effecting a registration procedure of the property data of said frame data upon receipt of a property data registration request command, effecting a renewal processing of the content of preliminarily registered property data upon receipt of a property data renewal request command, and transferring the content of an equivalent property data to the requiring station upon receipt of a property data transfer request command.

In a second property data managing method of the present invention, the steps as follows are carried out.

In an information communication system which includes one system of an information transmission path for effecting data communication, and a plurality of stations connected with said information transmission path, a property data managing method includes the steps of judging command contents of frame data transmitted in successive frames through said information transmission path from said plurality of stations, effecting a registration procedure of the property data of said frame upon receipt of a property data registration request command, effecting a processing for registering the station serving as a transfer destination of an equivalent property data upon receipt of a property data transfer destination registration request command, effecting a renewal processing of the content of the preliminarily registered equivalent property data upon receipt of a property data renewal request command, judging whether or not a station wishing the transfer of the equivalent property data has been registered by the step of registering the transfer destination upon receipt of said property data renewal request command, transferring said property data to the station wishing the transfer of said property data when said station has been registered, and transferring the content of the equivalent property data upon receipt of property data transfer request command.

By the steps of the present invention as described above, an improved property data managing method for the information communication system is advantageously presented, with a substantial elimination of disadvantages inherent in the conventional methods of this kind.

BRIEF DESCRIPTION OF THE DRAWINGS

These and other objects and features of the present invention will become apparent from the following description taken in conjunction with the preferred embodiments thereof with reference to the accompanying drawings, in which;

FIGS. 1 to 5 relate to a property data managing method according to a first embodiment of the present invention.

FIGS. 1(a) to 1(d) are flow-charts showing processing procedures in a property data managing method according to the first embodiment of the present invention, FIG. 2 is a block diagram showing a general configuration of a property data managing apparatus employed for executing the method of FIGS. 1(a) to 1(d), FIG. 3 is a registration format diagram of property attribute data and contents for management in the property data managing apparatus, FIGS. 4(I) to (II) are frame format diagrams of communication frames related to property data management between the property data managing apparatus and each station.

FIGS. 7 to 11 relate to a property data managing method according to a second embodiment of the present invention.

FIG. 7(a) to 7e) are flow-charts showing processing procedures in a property data managing method according to the second embodiment of the present invention, FIG. 8 is a block diagram showing a general configuration of a property data managing apparatus employed for executing the method of FIGS. 7(a) to 7e), FIG. 9 is a registration format diagram of property attribute data and contents for management in the property data managing apparatus, FIGS. 10(I) and 10(II) are frame format diagrams of communication frames related to property data management between the property, data managing apparatus and each station, FIGS. 11(a) to 11(d) are processing sequence diagrams for realizing the property data managing method of the present invention.

DETAILED DESCRIPTION OF THE INVENTION

Figure 1A:
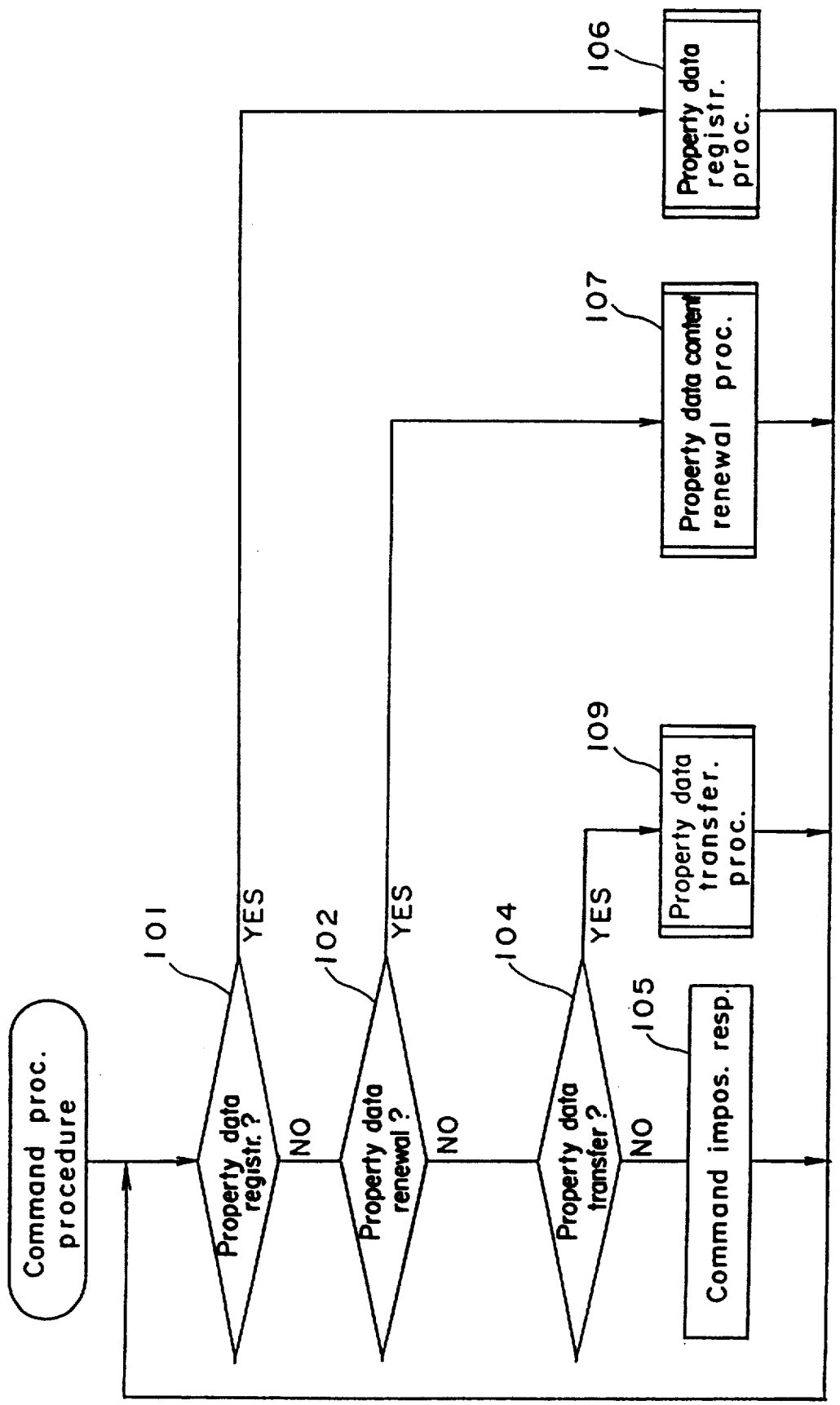
Figure 1:
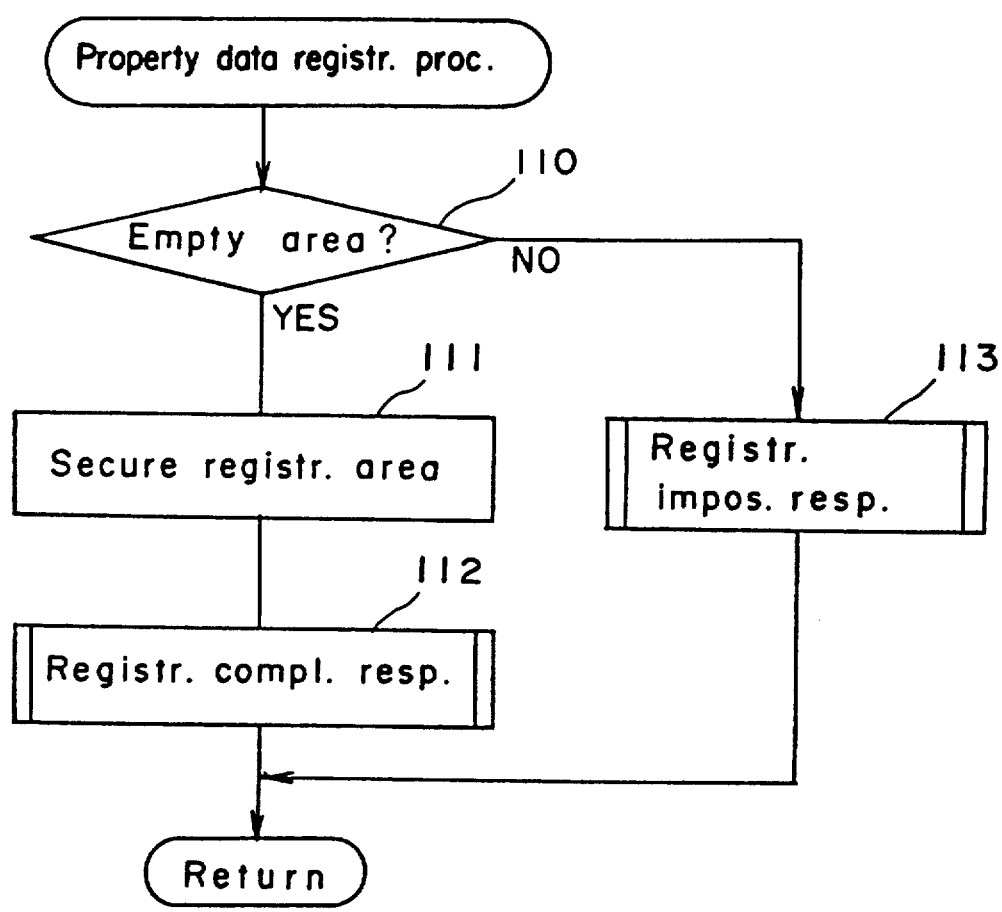

Before the description of the present invention proceeds, it is to be noted that like parts are designated by like reference numerals throughout the accompanying drawings.

Referring now to the drawings, embodiments according to the present invention will be described in detail in the following five sections.

(1) General description of the information communication system, (2) General configuration according to the present invention, (3) A first property data managing method according to the present invention, (4) A second property data managing method according to the present invention, (5) Application of the present invention to actual AV systems.

(1) General Description of the Information Communication System

(1.1) Definition of Basic Terms

The information communication system to be described hereinafter includes a plurality of stations connected to each other through a communication system provided with transmittance and code independency. The information is transmitted in a unit of variable length referred to as a frame. The physical mechanism for transmitting or receiving the information is called a communication control section. The communication line for carrying the information from one communication control unit to another communication control unit is referred to as an information transmission line.

The basic terms necessary for understanding the present specification will be briefly explained hereinbelow with reference to FIGS. 12 and 13.

* Stations 1002-1005: Appliances connected with an information transmission path 1001, and having a data communication function with respect to the other stations.

* Master: A station having present control of the communication system.

* Slave: A station designated by the master and bound to respond to the master.

* Transmitter: A station for transmitting data in a message field within a frame.

* Receiver: A station for receiving data in a message field within a frame.

* Property data: A general term denoting inherent data such as status information, etc., possessed by each station.

* Device address: An address for determining the station constituting the communication system as one rank, and one device address is defined per one station.

* Sub-device address: An address defined for each large function unit (sub-device) within one station, and a plurality of sub-device addresses are defined per one station.

* Property data address: An imaginary address for accessing the property data of each station. In order to read out a certain property data from other stations, it is necessary to designate the device address, sub-device address and property data address.

* Write sequence: A sequence in which the master functions as a transmitter to transmit a command and data with respect to the slave, and includes two kinds of sequences, i.e. a write command sequence and write data sequence.

* Read sequence: A sequence in which the master functions as a receiver to collect data from the slave.

* Frame 1110: A unit of information to be transmitted from one station to another station, which includes a header field 1125, master field 1126, slave field 1127, control field 1128, and message field 1129.

* Mode region 1112: For differentiation of the transfer speed for frames and transferable no. of bytes for messages.

* Header field 1125: An area for differentiation between the instruction of starting of the frame and the mode of the frame.
* Master field 1126: An area for presenting the address of the master.
* Slave field 1127: An area for presenting the address of the slave, which is designated by the master.
* Control field 1128: An area for setting the transmitting direction of the message field in the frame and the meaning of the content stated in the message field, and also, for effecting lock control.
* Message field 1129: A data area for transmitting messages. In this area, it is possible to continuously transfer a plurality of blocks combined into one block, the data region 1121 of 8 bits, end-of-data bit 1122 of 1 bit, parity bit 1123 of 1 bit, and ACK bit 1124 of 1 bit.
* Arbitration: A collision control for determining priority when a plurality of stations simultaneously attempt to start transmission of frames. The control is executed in the periods for the header field 1125 and the master field 1126.
* Lock control: A function which is designated by the station as the master with respect to the station as the slave. Once the slave is subjected to locking, it can not accept any frame having a content which would alter the state of the slave from any other station which becomes the master during the period before the locking is released.

(1.2) Fundamental Construction of the System

Figure 12:
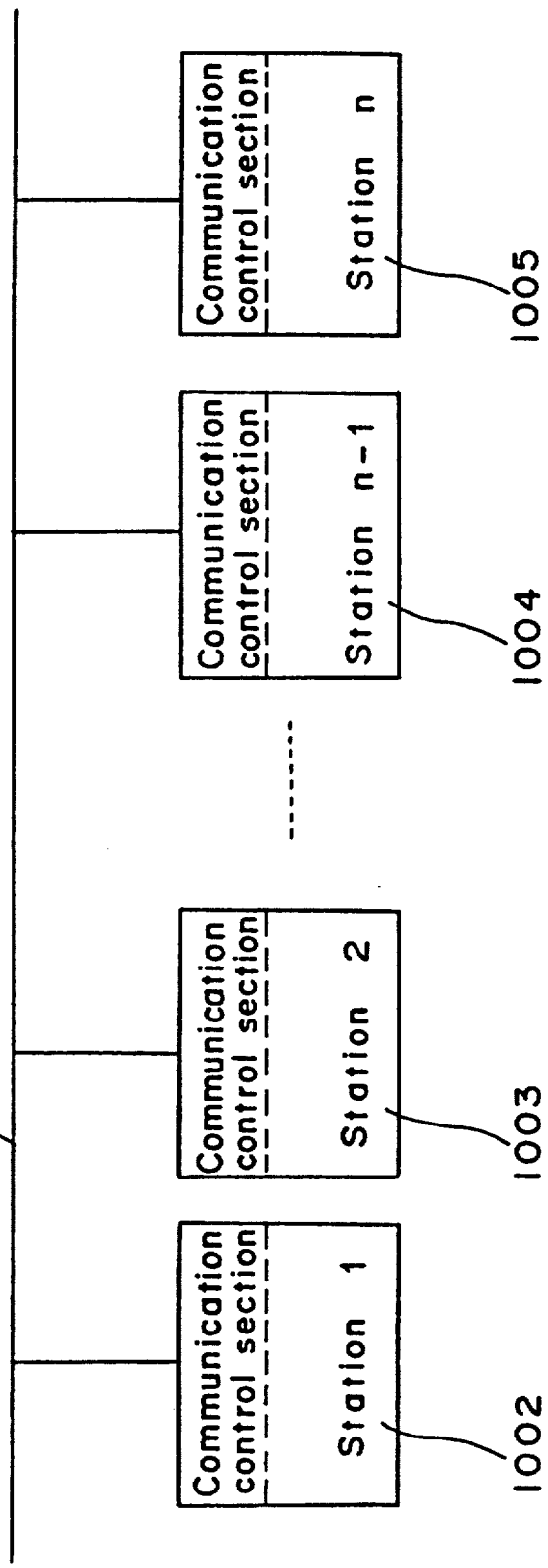
FIG. 12 is a block diagram showing a fundamental configuration of a conventional communication system.

FIG. 12 shows the fundamental configuration of a conventional information communication system, in which a plurality of stations 1002, 1003, - - - 1004, and 1005 are connected to each other via a single system information transmission path 1001. In the system, no central control unit is provided for collectively controlling the operation of the entire system.

(1.3) Frame Format and Basic Communication Procedure

Figure 13:
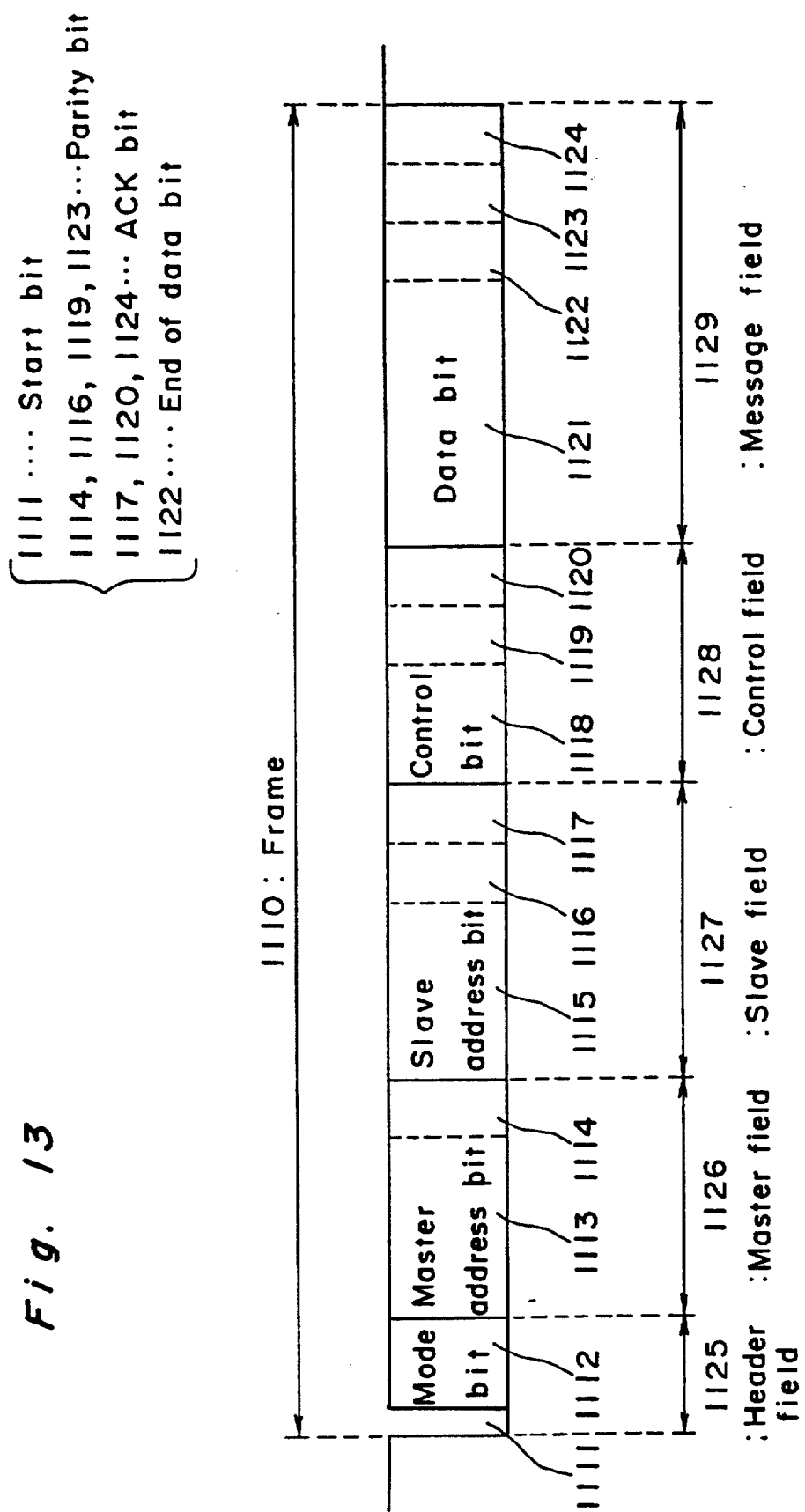
FIG. 13 is a frame format diagram showing the configuration of the communication frame for the communication system to which the present invention may be applied.

FIG. 13 shows the configuration of a frame of a communication system to which the present invention may be applied.

In FIG. 13, the frame includes a header field 1125, a master field 1126, a slave field 1127, a control field 1128, and a message field 1129. The header field 1125 is constituted by a start bit 1111 which denotes the start of the frame, and a mode region 1112 which denotes a mode representing the transfer speed of the frame and the number of transferable bytes of messages. The master field 1126 includes a master address 1113 of 12 bits and a parity bit 1114 of 1 bit. The slave field 1127 of is constituted by a slave address 1115 of 12 bits, a parity bit 1116 of 1 bit, and ACK bit 1117 of 1 bit. In the case where a station is designated as a slave, the slave is obliged to return to the master an affirmative response via the ACK bit 1117 of the slave field 1127. Upon receipt of the affirmative response via the ACK bit 1117, the master continuously transmits a control field 1128 and subsequent data. On the other hand, upon receipt of a negative response, the master suspends the transfer of the frame. The control field 1128 includes a control region 1118 of 4 bits, a parity bit 1119 of 1 bit, and an ACK bit 1120 of 1 bit. The control region 1118 denotes the transmitting direction of the message field 1129 in the frame, the control to be carried out with respect to the contents in the message field (i.e. the control content), and the lock control.

Table 1 below shows the relation between the contents of the control region 1118 and the contents of the message field, the transmitting direction and the definition of the lock control.

TABLE 1

| control (1118) | Contents | Lock function | Data Transmitting Direction |
|---|---|---|---|
| 0000 | Slave status reading | No lock | Slave |
| 0001 | Undefined | Undefined | → |
| 0010 | Slave status reading | Lock | Master |
| 0011 | Data reading | Lock | |
| 0100 | Lock address reading (middle and low order 4 bits) | No lock | 1. Master receiver |
| 0101 | Lock address reading (high order 4 bits) | No lock | |
| 0110 | Slave status reading | Lock release | 2. Slave transmitter |
| 0111 | Data reading | Lock release | |
| 1000 | Property memory address writing | Lock | Master |
| 1001 | Undefined | Undefined | → |
| 1010 | Command writing | Lock | Slave |
| 1011 | Data writing | Lock | |
| 1100 | Undefined | Undefined | 1. Master transmitter |
| 1101 | Undefined | Undefined | |
| 1110 | Command writing | Lock relase | 2. Slave receiver |
| 1111 | Data writing | Lock release | |

In the case where the control content designated by the control region 1118 from the master is acceptable, the slave returns an affirmative response to the master via the ACK bit 1120, and when it is not acceptable, the slave returns a negative response thereto. Upon receipt of the affirmative response via the ACK bit 1120, the master proceeds to the message field 1129, while, when the negative response is received, the master suspends transfer of the frame.

The message field 1129 is constituted by a plurality of blocks each including a data region 1121 of 8 bits, an end of data bit 1122 of 1 bit indicating the final data bit of the message field, a parity bit 1123 of 1 bit and an ACK bit 1124 of 1 bit. The station designated as a receiver of the control region 1118 returns an affirmative or negative response to the transmitter via the ACK bit 1124, each time the end of data bit 1122 is received. The transmitter which has received a negative response suspends the transmission of the message field thereafter.

In this system, all of the stations 1002 to 1005 have the right to be the master and are able to effect control for starting transmission of the frame 1110 and transmission timing by designating the slave. Although all of the stations 1002 to 1005 have the right to be the master and to start the transmission of the frame 1110, only one master can occupy the information transmission path 1001 during a same time period. Accordingly, when a plurality of masters intend to transmit a frame simultaneously, it is necessary to determine priority by effecting arbitration. A station designated by the slave address region 1115 in the slave field 1127 of the frame 1110 as transmitted by the master becomes the slave, and is obliged to return the response 1117 to the master. Whether a particular station functions as a transmitter or a receiver is determined by the control field 1128 in the frame 1110. Thus, in the transmission of a certain frame, it is possible for each station to take on any one of the four functions of master transmitter, master receiver, slave transmitter and slave receiver.

(2) General Construction According to the Present Invention

Before explaining specific embodiments of the present invention, the general arrangement according to the present invention will be described.

(2.1) The Purpose of the Present Invention

As noted earlier, the main object of the present invention is to provide an improved property data managing method in which, among the plurality of stations connected to each other via the single system information transmission path, transfer of inherent property data possessed by each station is smoothly effected, together with a simultaneous reduction of processing required for each station.

(2.2) Construction

The overall configuration according to the present invention will be described hereinafter with reference to a block diagram shown in FIG. 6.

Figure 6:
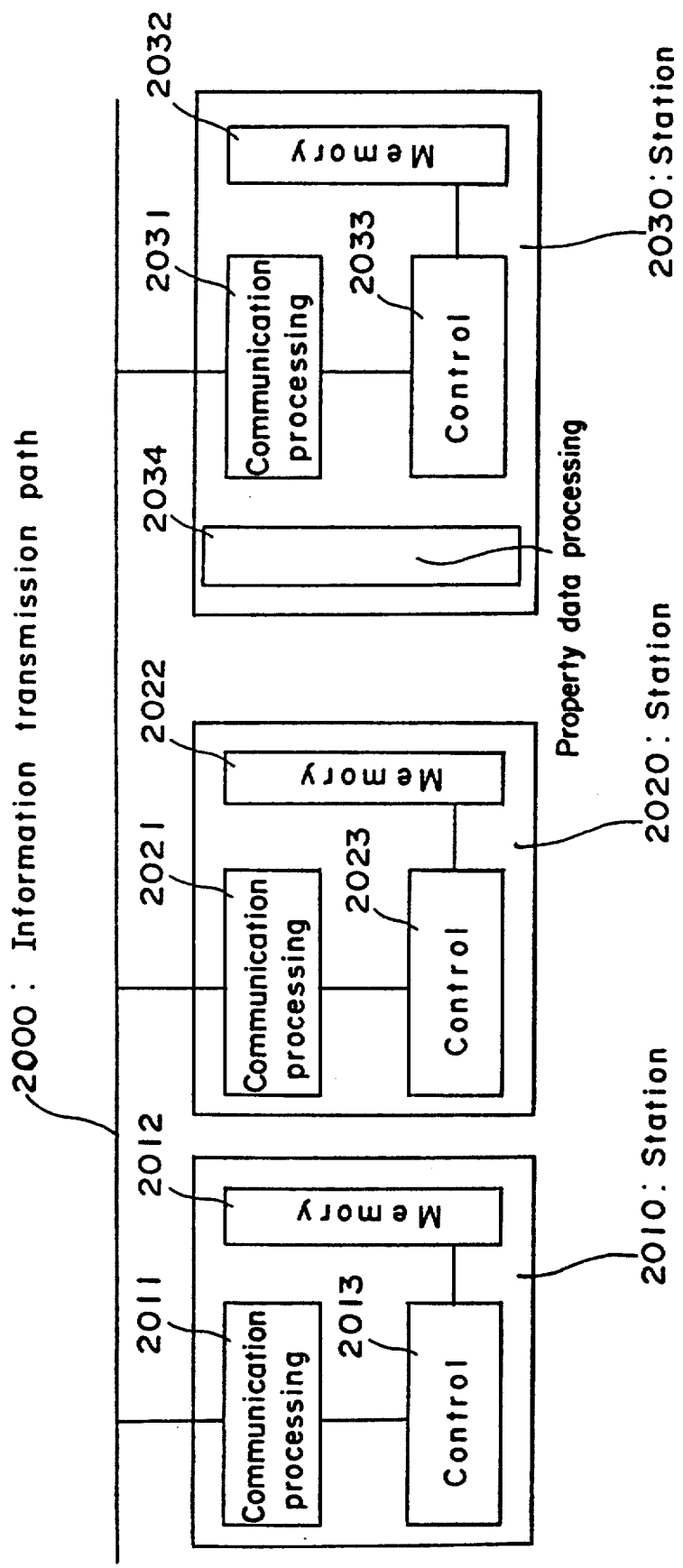
FIG. 6 is a block diagram showing a general configuration of the communication system for effecting the property data managing method according to the present invention.

As shown in FIG. 6, the information communication system according to the embodiment of the present invention includes a plurality of stations 2010, 2020, 2030, which are connected to each other via an information transmission path 2000. The internal construction of the stations 2010, 2020, and 2030 as represented, for example, by the station 2010, at least includes a communication processing section 2011, a memory section 2012 and a control section 2013, and may be further provided with apparatus for executing application functions peculiar to each appliance in the case where the information communication system is utilized for appliances such a video tape recorders or the like. Moreover, at least one of the stations constituting the information communication system is provided with a property data processing section 2034 (the station 2030 in FIG. 6) for realizing the property data managing method.

(2.3) Operation

In the conventional technique, it has been a practice to utilize the method as referred to earlier in item (A) of the above description of the prior art, in which, when the station 2010 requires the property data of the station 2020, the property address is written from the station 2010 to the station 2020 using the write sequence to subsequently read the content of the property data using the read sequence.

On the contrary, in the first property data managing method according to the present invention, for example, the property data which is likely to be transferred by the station 2010 to other stations, is registered in the station 2030 having a property data processing section 2034, and in a similar manner as in the first property data management, each time the content of the property data in the station 2010 is renewed, a report is made to the property data processing section 2034 that the registered property data has been renewed. Accordingly, in the case where another station, for example, the station 2020 wishes to refer to the property data of the station 2010, it executes the read sequence not directly to the station 2010, but to the station 2030 having the property data processing section 2034.

In the next place, according to the second property data managing method of the present invention, for example, the property data which is likely to be transferred by the station 2010 to other stations is similarly registered in the station 2030 having the property data processing section 2034, and in a similar manner as in the first property data management, each time the content of the property data in the station 2010 is renewed, a report is made to the property processing data section 2034 that the registered property data has been renewed.

In the property data processing section 2034 of the station 2030, a destination the registration for identifying stations setting to which each property data is to be transferred is prelimininarily accepted, and, for example, upon receipt of a notice that the content of the registered property data has bee renewed from the station 2010, the content of said property data is transferred to the registered destination.

(3) A first Property Data Managing Method According to the Present Invention Subsequently, the first property data managing method of the present invention will be described hereinafter.

(3.1) Arrangement in the Embodiment

Figure 1C:
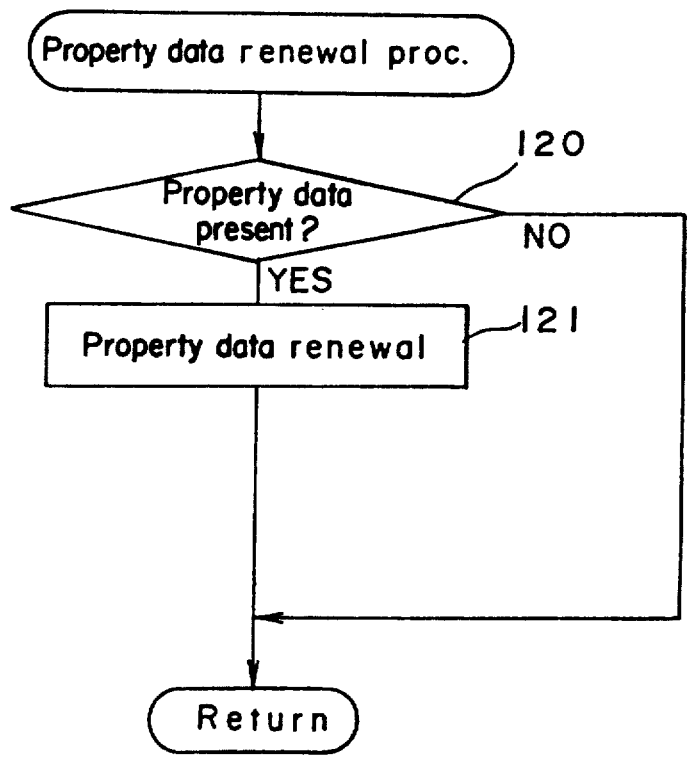
Figure 1D:
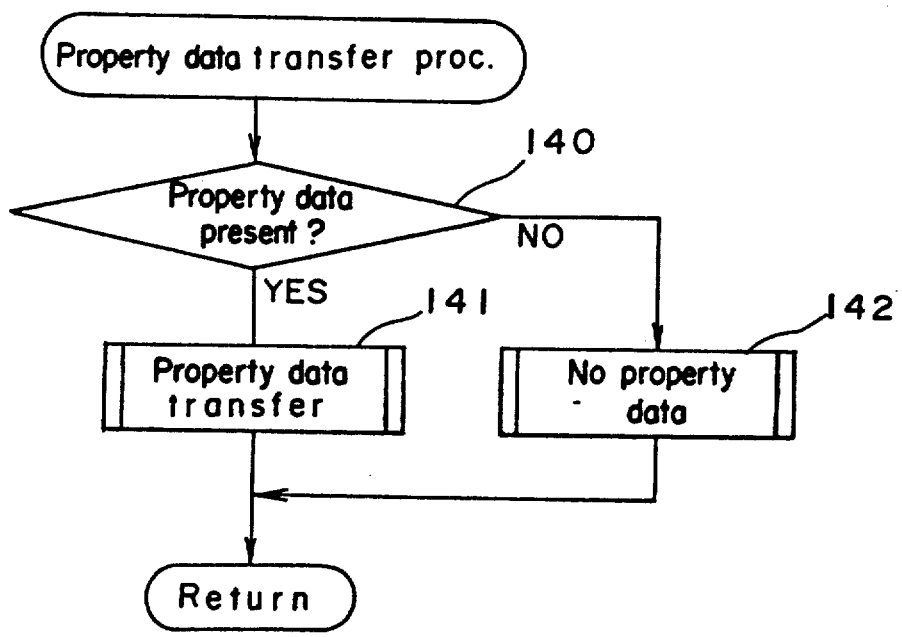
Figure 2:
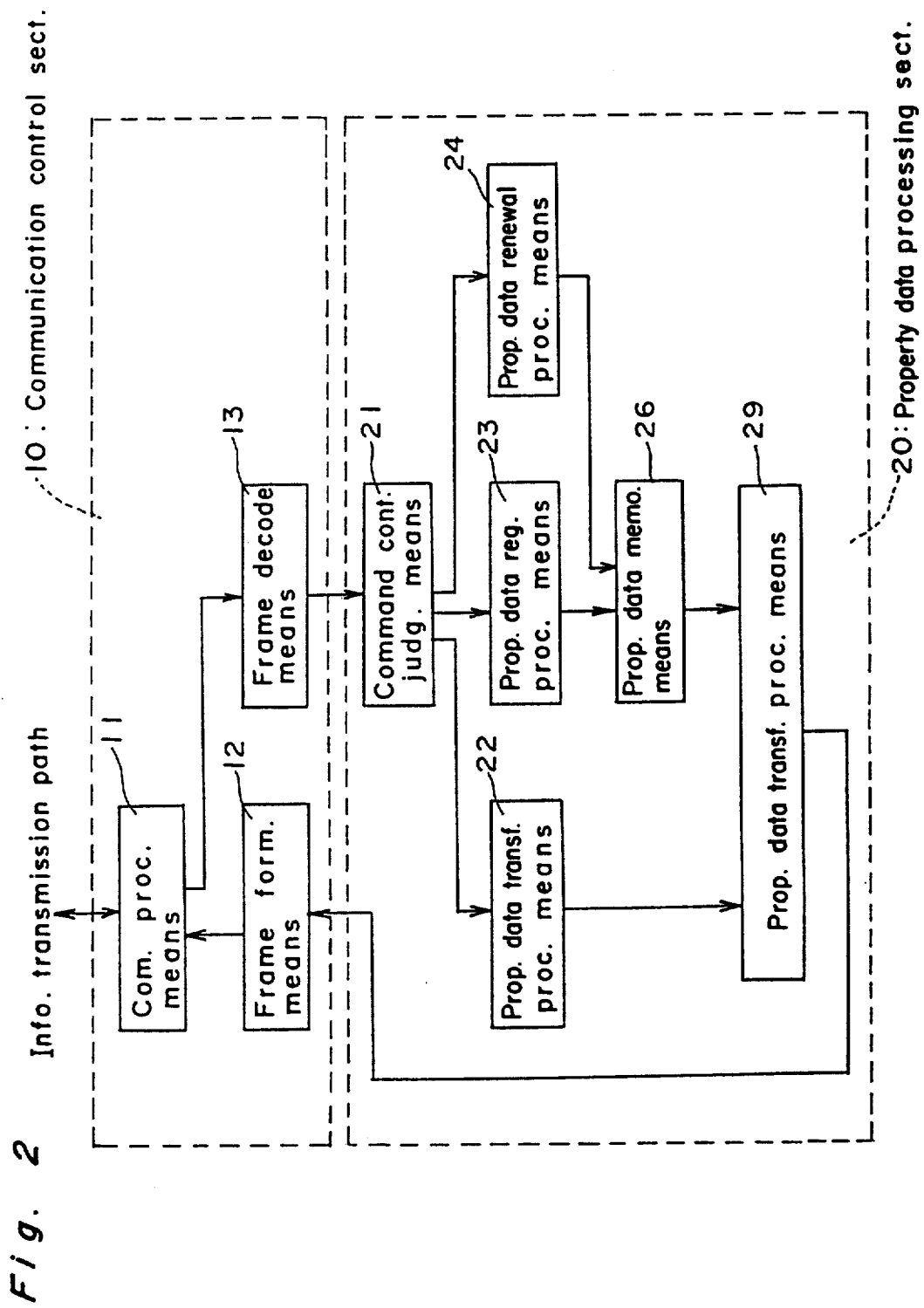

FIGS. 1(a) to 1(d) are flow-charts showing processing procedures related to the first property data managing method of the present invention, and FIG. 2 shows a block diagram of a property data managing apparatus employed for executing the method of FIGS. 1(a) to 1(d).

In FIG. 2, a communication control section 10 includes a communication processing means 11 connected to an information transmission path, and a frame forming means 12 and a frame decoding means 13 coupled with said communication processing means 11, and corresponds to the communication processing section 2011, 2021, or 2031 shown in FIG. 6. The communication control section 10 effects the processing for receiving the frame transferred from other stations through the information transmission path so as to hand-over the received frame with respect to a property data processing section 20, and for sending the frame received from said property data processing section 20 to other stations through the information transmission path.

The property data processing section 20 includes a command content judging means 21 connected to the frame decoding means 13 of the communication control section 10 and coupled with a property data transfer processing means 29 through a property data registration processing means 23 and a property data memory means 26, a property data renewal processing means 24 connected between the means 21 and 26, and a property data transfer processing means 22 also connected between the means 21 and 29, with the property data transfer processing means 29 being further connected to the frame forming means 12 of the communication control section 10.

The property data processing section 20 referred to above is constituted, for example, by a microprocessor, and effects data processing to be described later according to a control program written in a memory (not shown).

Hereinafter, a description will be given based on an imaginary circuit block having such processing functions.

Figure 3:
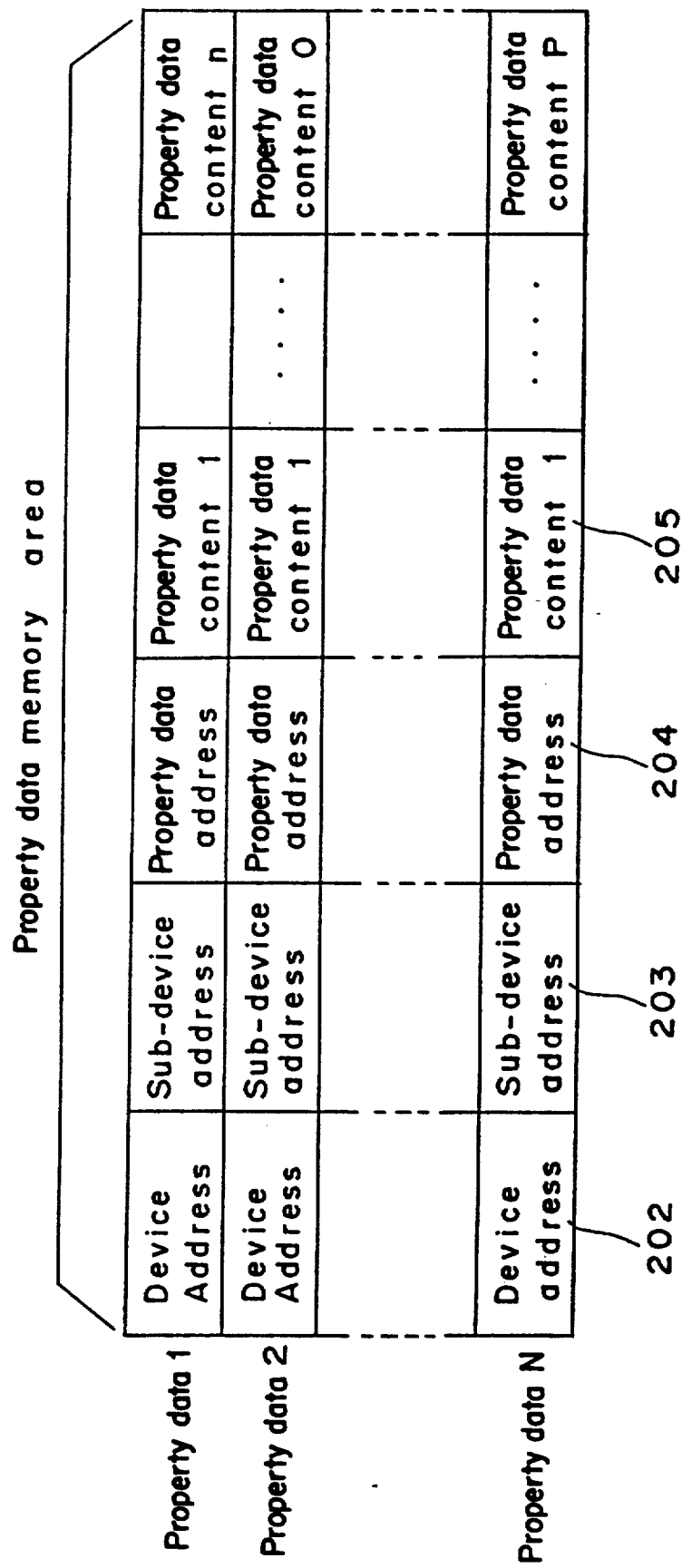
Figure 4:
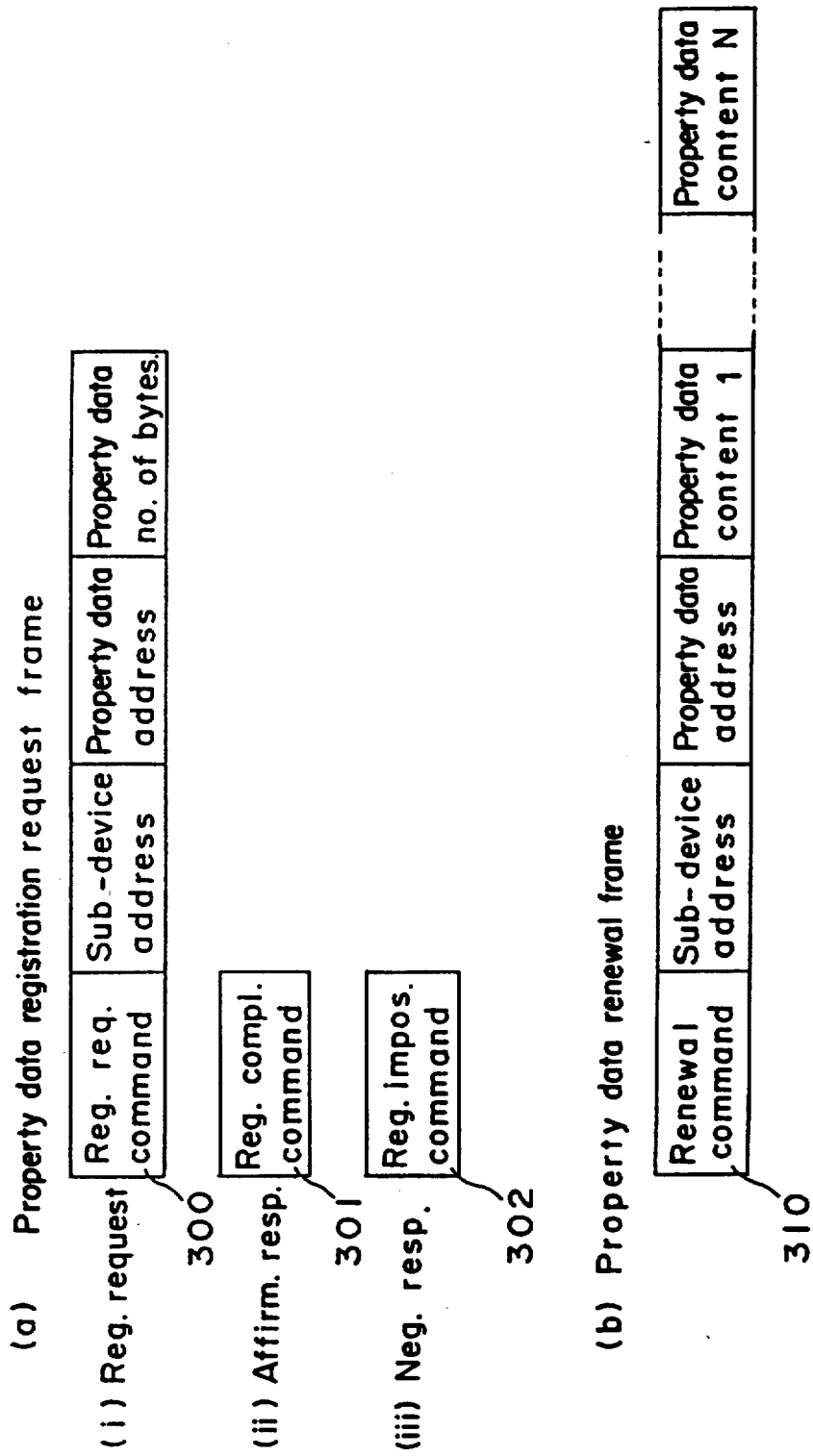

FIG. 3 is a data format diagram in the case where the property data are stored in the property data memory means 26, and FIGS. 4(I) and 4(II) are frame format diagrams in the case where communication is effected between other stations 2010, 2020, - - - etc. and the station 2030 having the property data processing section 2034.

For requesting registration of the property data, the request is effected through employment of "Registration request command" 300. With respect to the above, the property data processing section 20 returns a "Registration completion command" 301 when the request is accepted, and "Registration impossible command" 302 when the request is to be rejected for some reason such as insufficient memory area, etc.. For renewal of the content of the registered property data, a "Renewal command" 310 is used. Meanwhile, for requesting transfer of the content of the property data registered from other stations, a "Transfer request command" 330 is employed, and in the case where the content of the property data a requested is to be returned in response to the above, transfer processing is effected by the use of a "Transfer command" 340.

Figure 5A:
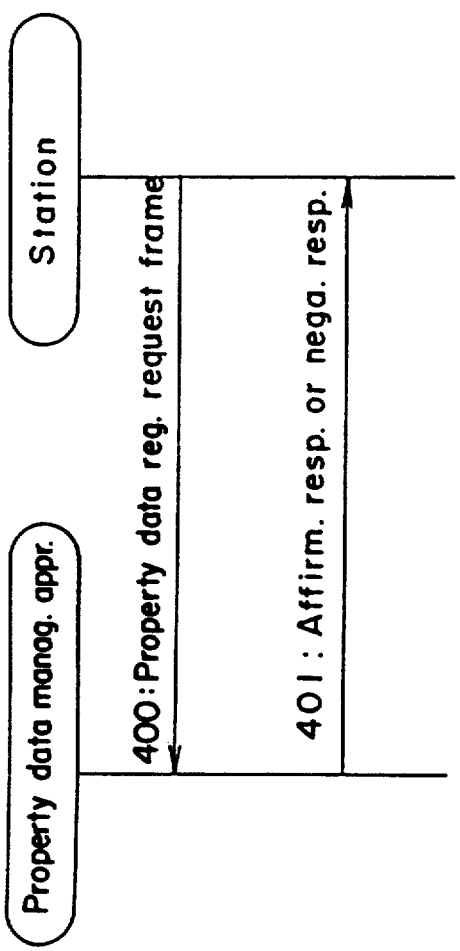
FIGS. 5(a) to 5(c) are processing sequence diagrams for realizing the property data managing method of the present invention.
Figure 5B:
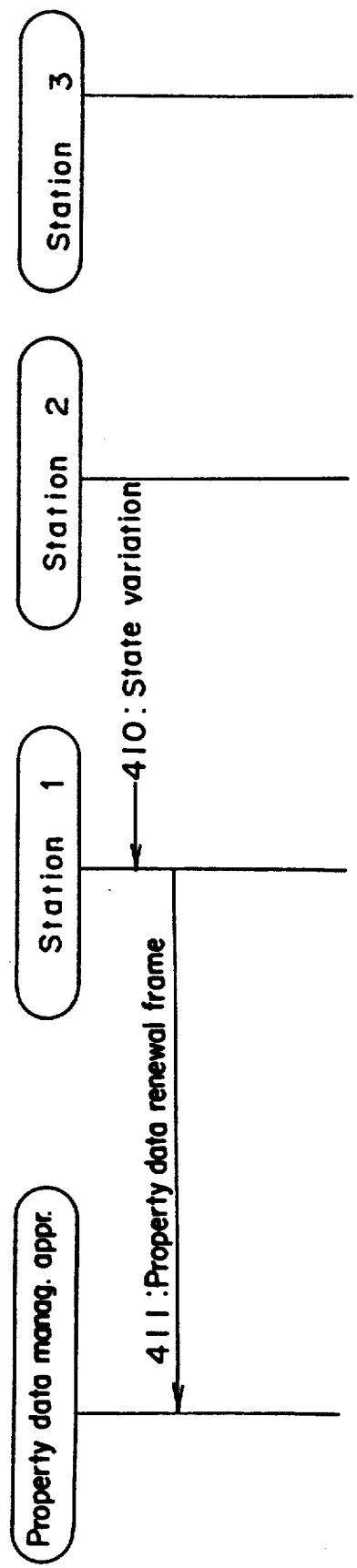
Figure 5C:
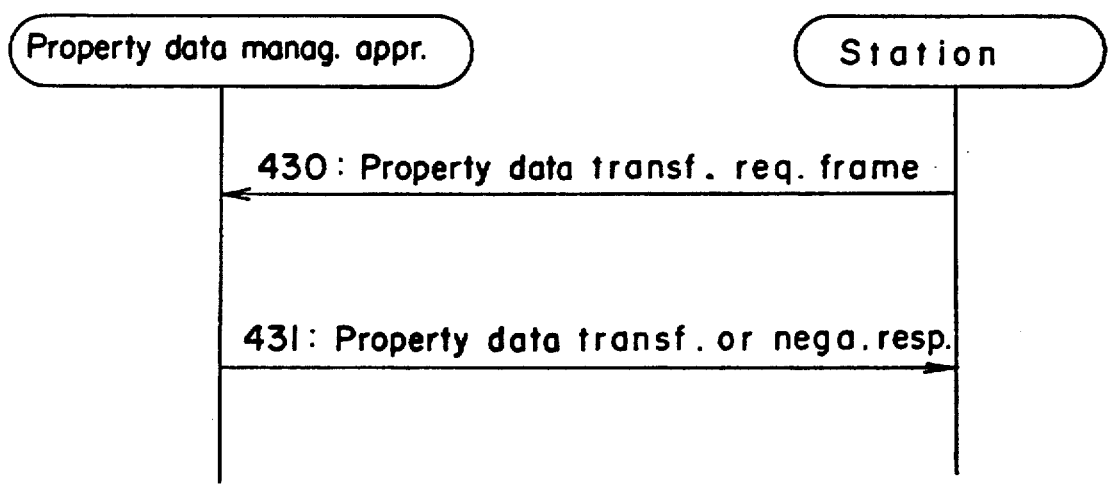

FIGS. 5(a), 5(b) and 5(c) are communication sequence diagrams for effecting respective processings through employment of the frames shown in FIGS. 4.

(3.2) Operation

The frame received from the another station through the information transmission path is decoded by the frame decoding means 13 in the communication control section 10, and the necessary portion of the frame is handed over to the command content judging means 21 within the property data processing section 20. In the command content judging means 21, processing is effected according to the flow-chart of FIG. 1(a).

In the first place, at step 101, it is checked whether or not the command of the frame is a "Registration request command" 300. If the frame is a "Registration request command" 300, the frame is handed over to the property data registration processing means 23, and the property data registration processing at Step 106 is executed. The content of the property data registration processing 106 is shown in FIG. 1(b).

In the property registration processing 106 in FIG. 1(b), it is first checked at Step 110 whether or not an area necessary for accommodating the property data requested for registration is present in the property data memory means 26. If it is judged that a memory area for accommodating the property data is present, the property data registration area is secured in the memory means 26 at Step 111, and at Step 112, the registration completion response 301 is returned to the requesting station for termination of the processing.

The property data memory means 26 stores at least the device address 202, sub-device address 203, property data address 204 and property data content 205 shown in FIG. 3.

At Step 110, in the case where it is judged that the memory area necessary for storing the property data can not be secured within the property data memory means 26, a registration impossible response 302 is returned with respect to the requesting station at Step 113, and thus, the processing is completed.

Returning to FIG. 1(a), at Step 101, when it is judged that the frame does not contain a "Registration request command" 300, the procedure proceeds to Step 102 to effect a judgement as to whether or not the control content of the frame is a "Renewal command" 310. If the content thereof is a "Renewal command" 310, the frame is handed over to the property data renewal processing means 24, and the property data content renewal processing at Step 107 is effected. The content of the property data content renewal processing of Step 107 is shown in FIG. 1(c).

In the property data content renewal processing 107, it is first checked at Step 120, whether or not the associated property data requiring renewal is already registered in the property data memory means 26. If the associated property data is confirmed to have been registered in the property data memory means 26, the content of the property data is renewed at Step 121 for completion of the processing. Meanwhile, at Step 120, if the associated property data is judged not to have been already registered, the property data renewal processing 107 is terminated without executing any processing.

Returning to FIG. 1(a), at Step 102, if it is judged that the frame does not contain a "Renewal command" 310, the procedure proceeds to Step 104 to check whether or not the frame contains a "Transfer requesting command" 330. In the case where the control content of the frame is a "Transfer requesting command" 330, the frame is handed over to the property data transfer processing means 29 and the property data content transfer processing at Step 109 is executed.

The content of the property data content transfer processing at Step 109 is shown in FIG. 1(d).

In the property data content transfer process of Step 109, it is first checked, at Step 140, whether or not the property data to be transferred has been registered in the property data memory means 26. If the property data is confirmed to have been registered in the property data memory means 26, the property data transfer processing means 29 is instructed at Step 141 to return the property data content transfer frame to the requesting station through utilization of a "Transfer command" 340. On the contrary, at Step 140, if it is judged that the property data has not been registered, a "No equivalent property data command" 341 is returned to the requesting station, and the property data transfer processing at Step 109 is completed.

Returning once again to FIG. 1(a), at Step 104, when it is judged that the control content of the frame is not a "Transfer requesting command" 330, the frame is not to be processed by the property data processing section 20, the received frame is discarded, and all processings are terminated.

Subsequently, referring to FIGS. 5(a) to 5(c), processing sequences in the case where a certain station executes respective processings for (a) property data registration (b) property data content renewal, and (c) property data transfer request through employment of the property data managing method described so far, will be explained.

(a) Property Data Registration Sequence

In the case where a certain station registers the property data present in the property data processing section, it first transfers the property data registration request frame 400 with respect to the property data managing apparatus through employment of a "registration request command" 300. After effecting the earlier described processing with respect to the property data registration request frame 400, the property data managing apparatus returns the response frame 401 using a "Registration completion command" 301 or "Registration impossible command" 302, to thereby complete the property data registration sequence.

(b) Property Data Content Renewal Sequence

When a certain station has its internal state varied, due to an operation by an operator, etc., (as at 410 in FIG. 5(b)), it transfers a property data renewal frame 411 to the property data managing apparatus through use of a "Renewal command" 310. In the property data managing apparatus, the processing with respect to the "Renewal command" 310 is effected by the method as described above, to thereby complete the property data content renewal sequence.

(c) Property Data Transfer Request Sequence

When a certain station wishes to obtain the property data of another station, it transfers the property data transfer frame 430 to the property data managing apparatus through employment of a "Transfer request command" 330. With respect to the above, the property data managing apparatus, after effecting the earlier described processing, returns the response frame to the requesting station through employment of a "Transfer command" 340 or "No equivalent property command" 341, and thus, the property data transfer sequence is completed.

(4) A second Property Data Managing Method According to the Present Invention

(4.1) Arrangement of the Embodiment

Figure 7A:
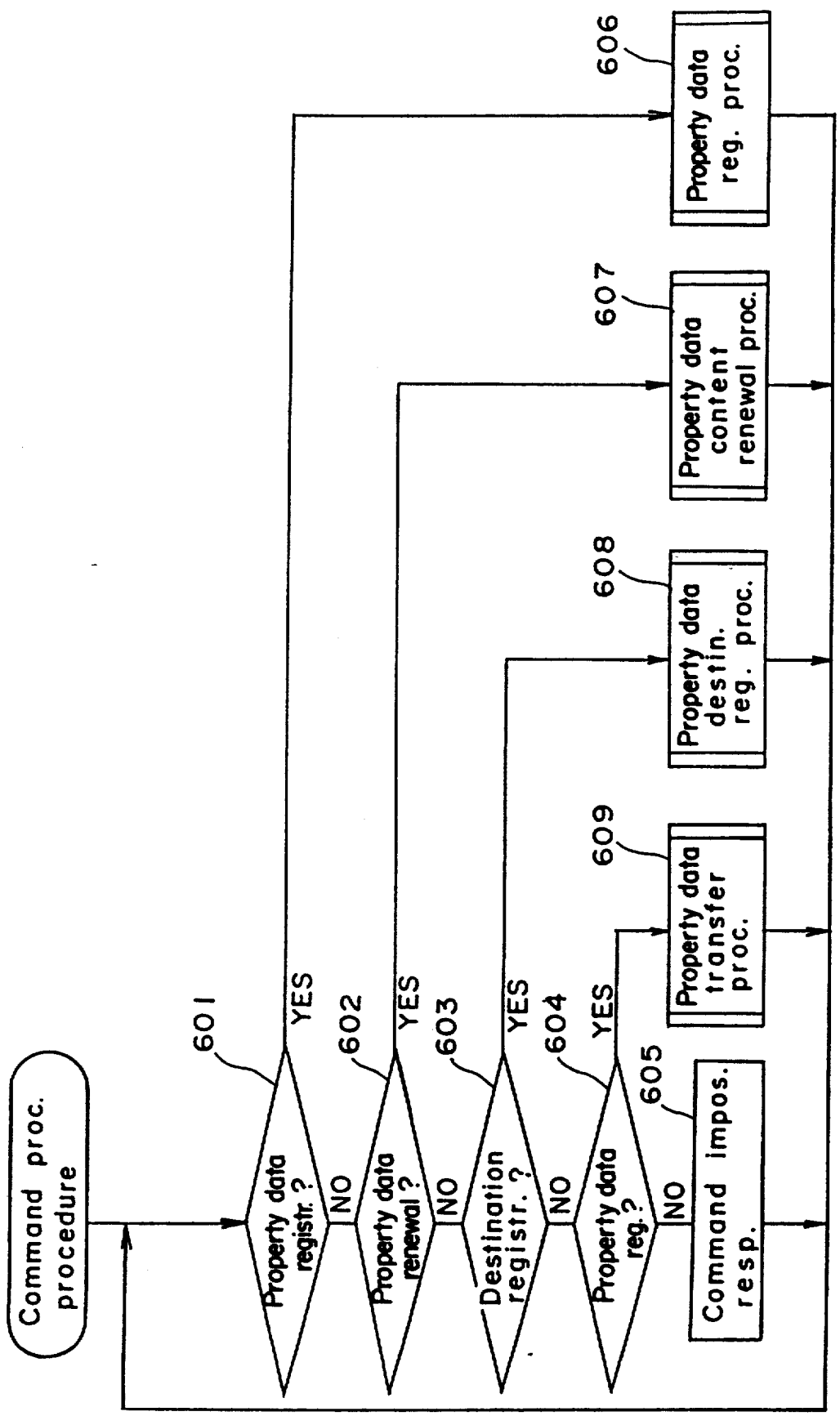
Figure 7B:
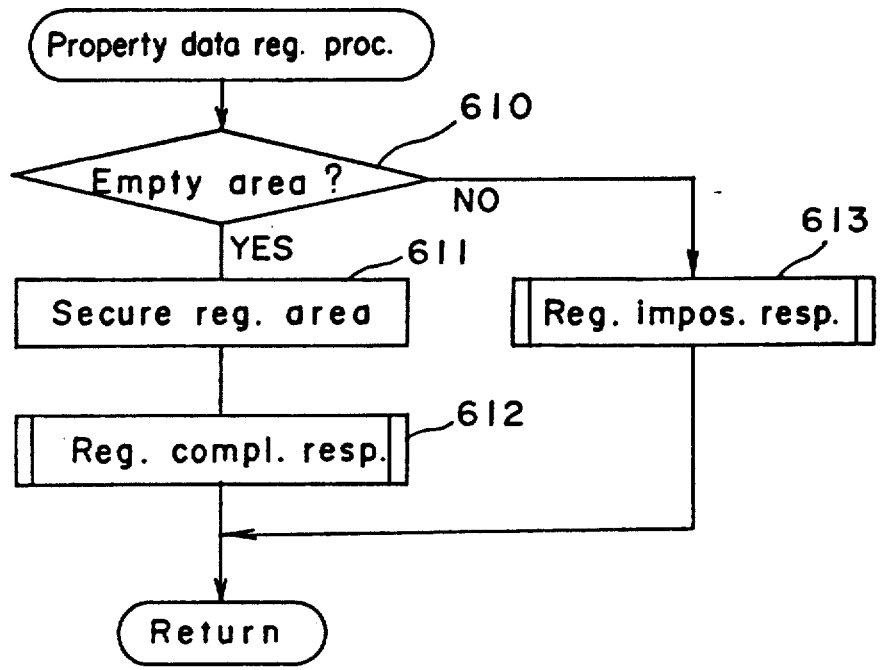
Figure 7C:
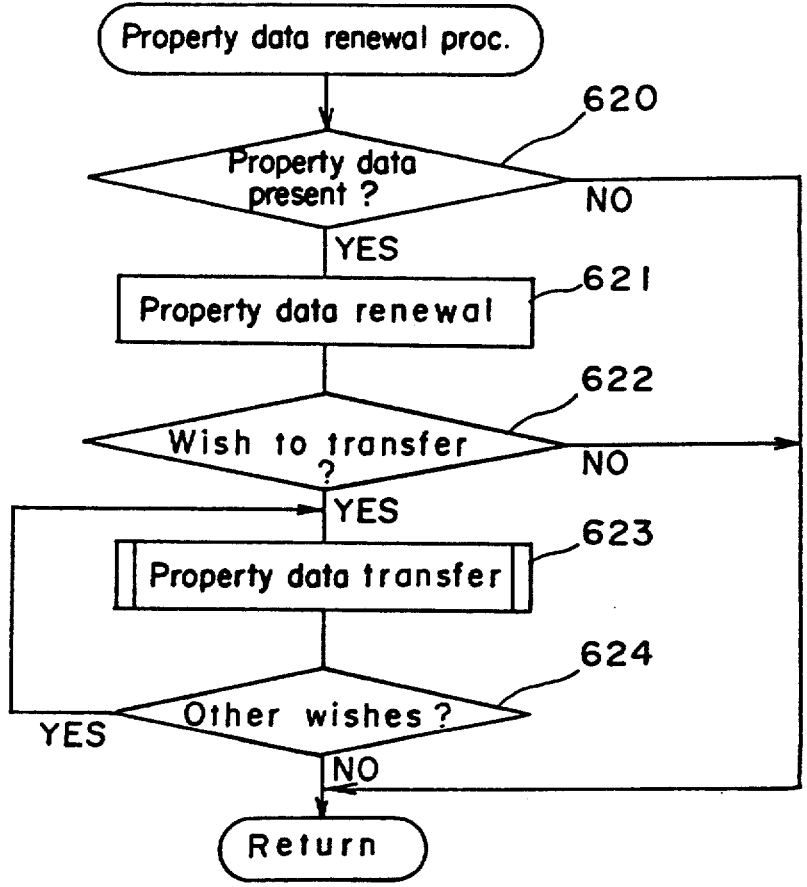
Figure 7:
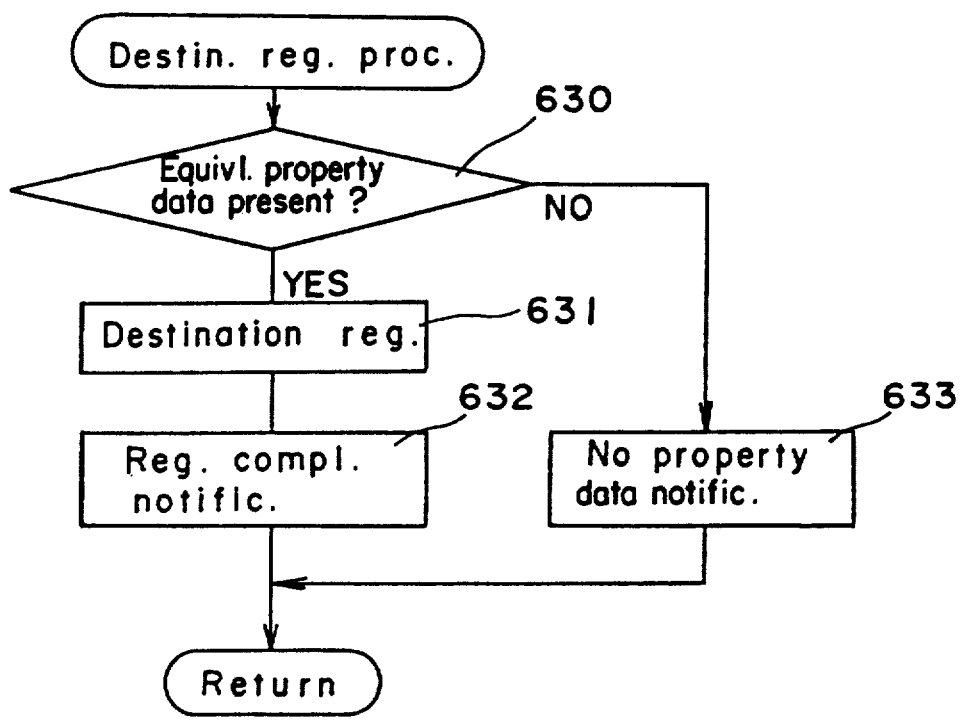
Figure 7:
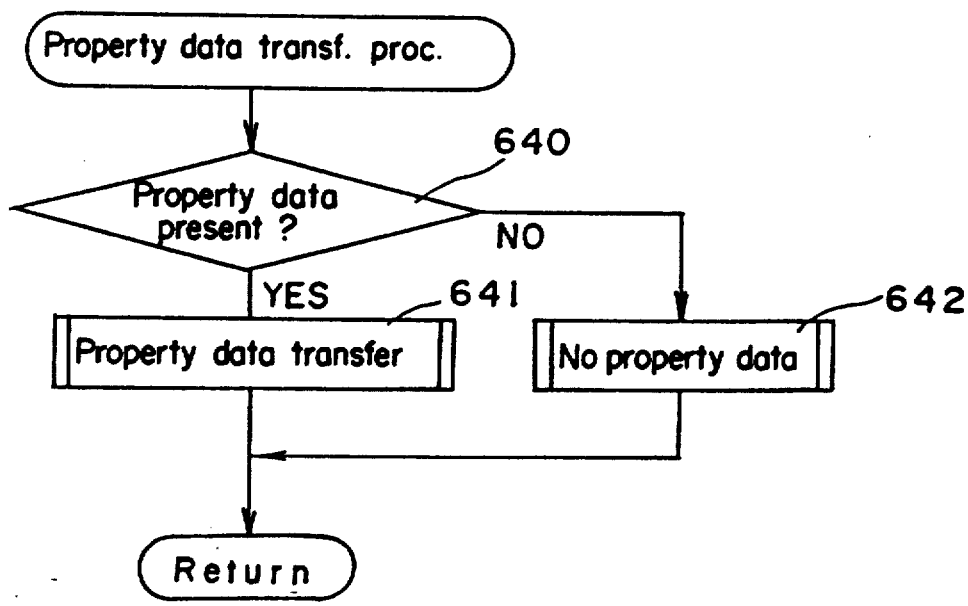
Figure 8:
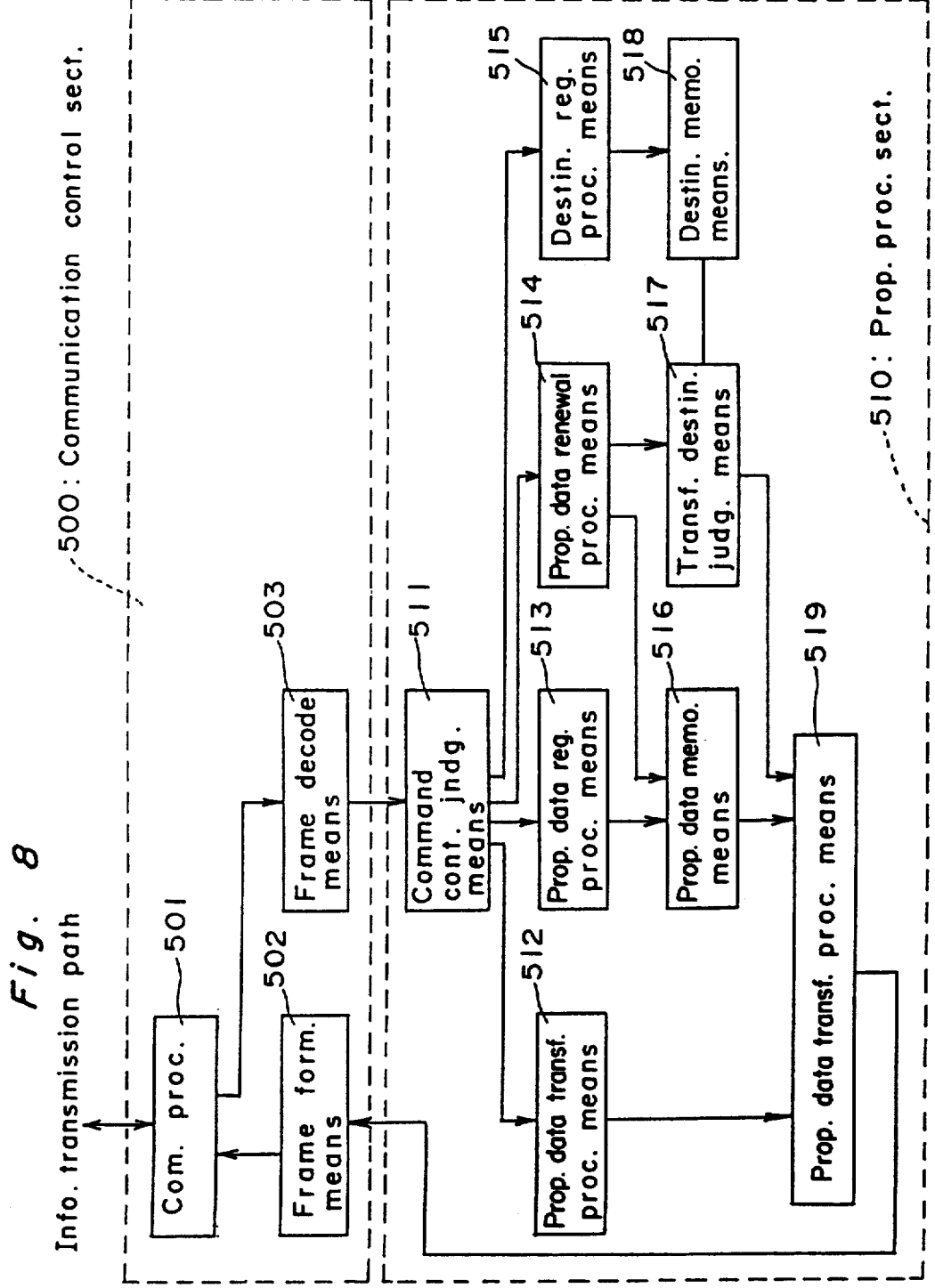

FIGS. 7(a) to 7e) are flow-charts showing processing procedures related to the second property data managing method of the present invention, and FIG. 8 shows a block diagram of a property data managing apparatus employed for executing the method of FIGS. 7(a) to 7e).

In FIG. 8, a communication control section 500 includes a communication processing means 501 connected to an information transmission path, and a frame forming means 502 and a frame decoding means 503 coupled with said communication processing means 510, and corresponds to the communication processing section 2011, 2021 or 2031 shown in FIG. 6. The communication control section 500 effects the processing for receiving the frame transferred from other stations through the information transmission path so as to hand-over the received frame with respect to a property data processing section 510, and for sending the frame received from said property data processing section 510 to other stations through the information transmission path.

The property data processing section 510 includes a command content judging means 511 connected to the frame decoding means 503 of the communication control section 500 and coupled with a property data transfer processing means 519 through a property data registration processing means 513 and a property data memory means 516, a property data renewal processing means 514 connected between the means 511 and 516 and further connected to the property data transfer processing means 519 through a transfer destination judging means 517, a transfer destination registration and processing means 515, and a transfer destination memory means 518 connected between the command content judging means 511 and the transfer destination judging means 517, and a property data transfer processing means 512 also connected between the means 511 and 519, with the property data transfer processing means 519 being further connected to the frame forming means 502 of the communication control section 500.

The property processing section 510 referred to above is constituted, for example, by a microprocessor, and effects data processing to be described later according to a control program written in a memory (not shown).

Hereinafter, a description will be given based on an imaginary circuit block having such processing functions.

Figure 9:
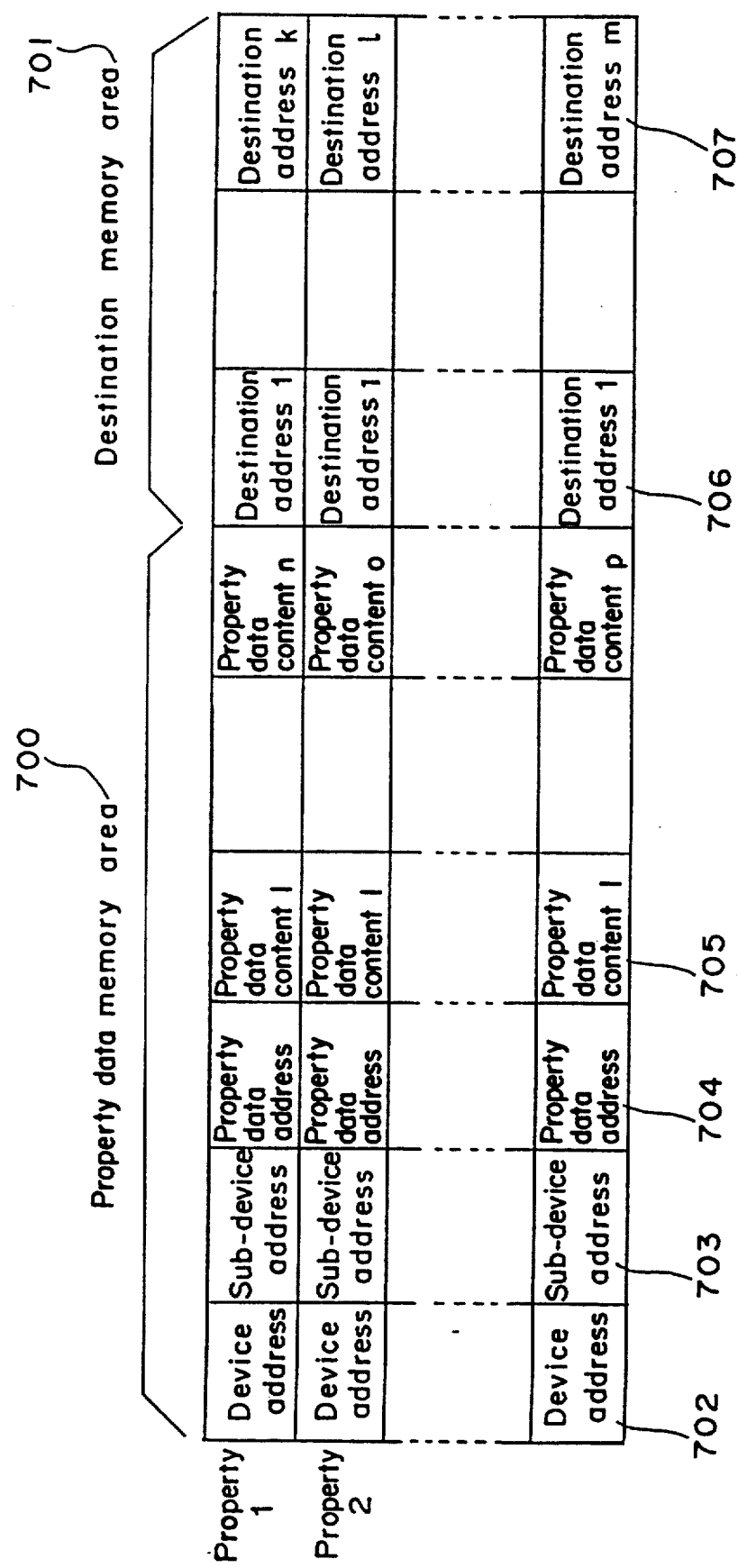

FIG. 9 is a data format diagram in the case where the property data and the transfer destination of the property data are stored in the property data memory means 516 and the transfer destination memory means 518, and FIGS. 10(I) and (II) are frame format diagrams in the case where communication is effected between other stations 2010, 2020, ---, etc. and the station 2030 having the property data processing section 2034.

For requesting registration of the property data, the request is effected through employment of a "Registration request command" 800. With respect to the above, the property data processing section 510 returns a "Registration completion command" 801 when the request is accepted, and a "Registration impossible command" 802 when the request is to be rejected for some reason such as insufficient memory area, etc. For renewal of the content of the registered property data, a "renewal command" 810 is used.

When the property data which has been registered within the property data processing section 510 is renewed, for registering to receive the transfer service of said property data, a "Transfer destination command" 820 is used. With respect to the above, the property data processing section 510 notifies the completion of the transfer destination registration through employment of a "Registration completion command" 821 upon reception of the command and completion of the registration, and, in the case where the request is to be refused for some reason such as the associated property data has not been registered, etc., said processing section 510 provides notification of the absence of the associated property data using a "No equivalent property data command" 820. For requesting transfer of the content of the property data registered from other stations, a "Transfer request command" 830 is employed, and in the case where the content of the property data as requested is to be returned in response to the above, a transfer processing is effected by the use of a "Transfer command" 840.

Figure 11A:
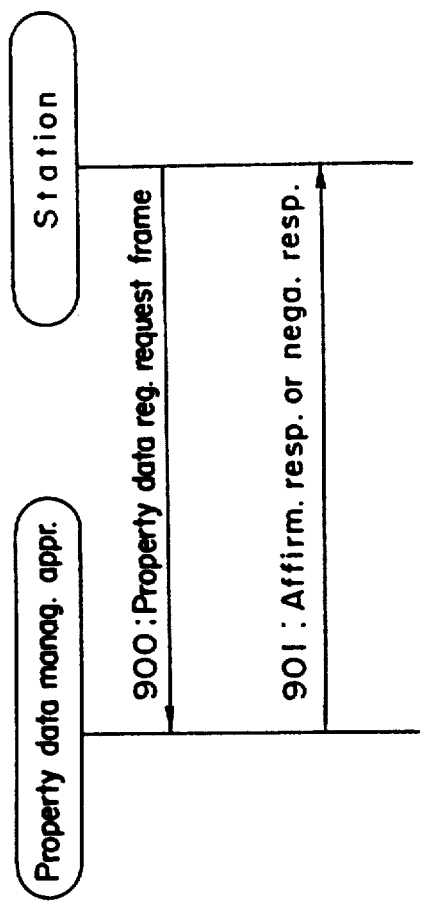

FIGS. 111(a) to 11(d) are communication sequence diagrams for effecting respective processings through employment of the frames shown in FIGS. 10.

(4.2) Operation

The frame received from another station through the information transmission path is decoded by the frame decoding means 503 in the communication control section 500, and the necessary portion of the frame is handed over to the command content judging means 511 within the property data processing section 510. In the command content judging means 511, processing is effected according to the flow-chart of FIG. 7(a).

In the first place, at Step 601, it is checked whether or not the command content of the frame is a "Registration request command" 800. If the frame command is a "Registration request command" 800, the frame is handed over to the property data registration processing means 513, and the property data registration processing at Step 606 is executed. The content of the property data registration processing 606 is shown in FIG. 7(b).

In the property data registration processing 606 in FIG. 7b), it is first checked at Step 610 whether or not a memory area necessary for accommodating the property data requested for registration is present in the property data memory means 516. If it is judged that the memory area for accommodating the property data is present, the property data registration area is secured in the memory means 516 at Step 611, and at Step 612, the registration completion response 801 is returned to the requesting station for termination of the processing.

The property data memory means 516 stores at least the device address 702, sub-device address 703, property data address 704 and property data content 705 shown in FIG. 9.

At Step 610, in the case where it is judged that the memory area necessary for storing the property data can not be secured within the property data memory means 516, a registration impossible response 802 is returned with respect to the requesting station at Step 613, and thus, the processing is completed.

Returning to FIG. 7(a), at Step 601, when it is judged that the frame does not contain a "Registration request command" 800, the procedure proceeds to Step 602 to effect a judgement as to whether or not the control content of the frame is a "Renewal command" 810. If the content thereof is a "Renewal command" 810, the frame is handed over to the property data renewal processing means 514, and the property data content renewal processing at Step 607 is effected. The content of the property data content renewal processing of Step 607 is shown in FIG. 7(c).

In the property data content renewal processing Step 607, it is first checked at Step 620 whether or not the associated property data requiring renewal is already registered in the property data memory means 516. If the property data is confirmed to have been registered in the property data memory means 516, the content of the property data is renewed at Step 621, and the processing is transferred to the transfer destination judging means 517. At Step 622, a transfer destination memory area 701 stored in the transfer destination memory means 518 is checked to see if the "transfer wish" of the associated property data has been registered. Here, when the registration of the "transfer wish" of the property data is confirmed, the device address 706 of the transfer destination is handed over from the transfer destination memory means 518 to the property data transfer processing means 519 at Step 623, and then, the content of the renewed property data is passed on from the property data memory means 516 to the property data transfer processing means 519, to thereby execute the transfer service of the property data to the registered transfer destination. Thereafter, at Step 624, the transfer destination memory means 518 is checked to see if there is any "transfer wish" registration, and if any registration is found, the procedure returns to Step 623 to repeat the above processing. If there is no other "transfer wish" registration, the property data renewal processing 607 is terminated. Meanwhile, at Step 620, if the property data is judged not to have been already registered, the property data renewal processing 607 is terminated without executing any processing.

Returning to FIG. 7(a), at Step 602, if it is judged that the frame does no contain a "Renewal command" 810, the procedure proceeds to Step 603 to check whether or not the frame contains a "Transfer destination command" 820. In the case where the command content of the frame is a "Transfer destination command" 820, the frame is handed over to the transfer destination registration processing means 515, and the property data transfer destination registration processing at Step 608 is executed.

The content of the property data transfer destination registration processing is shown in FIG. 7(d).

At Step 608 of the property data transfer destination registration processing, it is first checked at Step 630 whether or not the property data for which a transfer destination registration is desired (i.e. for which a "transfer wish" is to be stored) has already been registered in the property data memory means 516. If the property data to be transferred has already been registered in the property data memory means 516, the device address of the station requesting the transfer is registered in the transfer destination memory means 518 at Step 631. With respect to the format for the registration, as shown in the transfer destination memory area 601 in FIG. 9, the associated property data is adapted to correspond to the property data memory area 700 so as to store the transfer destination addresses 706, 707, and so forth. Thereafter, at Step 632, a "Registration completion command" 821 is returned to the requesting station to complete the transfer destination registration processing 608. At Step 630, if it is judged that the associated property data has not been already registered, the procedure proceeds to Step 633, and a "No equivalent property command" 822 is returned, whereby the transfer destination registration processing 608 is completed.

Returning again to FIG. 7(a), at Step 603, if it is judged that the frame does not contain a "Transfer destination command" 820, the procedure proceeds to Step 604 to check whether or not the frame contains a "Transfer requesting command" 830. In the case where the command content of the frame is a "Transfer requesting command" 830, the frame is handed over to the property data transfer processing means 519 and the property data content transfer processing at Step 609 is executed. The processing of the property data content transfer processing at Step 609 is shown in FIG. 7(e).

At Step 609 for the property content transfer processing, it is first checked, at Step 640, whether or not the property data to be transferred has been registered in the property data memory means 516. If the property data is confirmed to have been registered in the property data memory means 516, the property data transfer processing means 519 is instructed at Step 641 to return the property data content transfer frame to the requesting station through utilization of a "Transfer command" 840. On the contrary, at Step 540, if it is judged that the property data has not been already registered, a "No equivalent property command" 821 is returned to the requesting station, and the property transfer processing at Step 609 is completed.

Returning once again to FIG. 7(a), at Step 604, when it is judged that the command content of the frame is not a "Transfer requesting command" 830, the frame is not one to be processed by the property data processing section 510, the received frame is discarded, and all the processings are terminated.

(4.3) Processing Sequence

Subsequently, referring to FIGS. 11(a) to 11(d), processing sequences in the case where a certain station executes respective processings for (a) property data registration (b) property data content renewal, (c) property data transfer destination registration and (d) property data transfer request, through employment of the property data managing method described above, will be explained.

(a) Property Data Registration Sequence

In the case where a certain station registers the property data present in the property data processing section, it first transfers the property data registration request frame 900 with respect to the property data managing apparatus through employment of a "Registration request command" 800. After effecting the earlier described processing with respect to the property data registration request frame 900, the property data managing apparatus returns the response frame 901 using a "Registration completion command" 801 or "Registration impossible command" 802, to thereby complete the property data registration sequence.

(b) Property Data Content Renewal Sequence

Figure 11B:
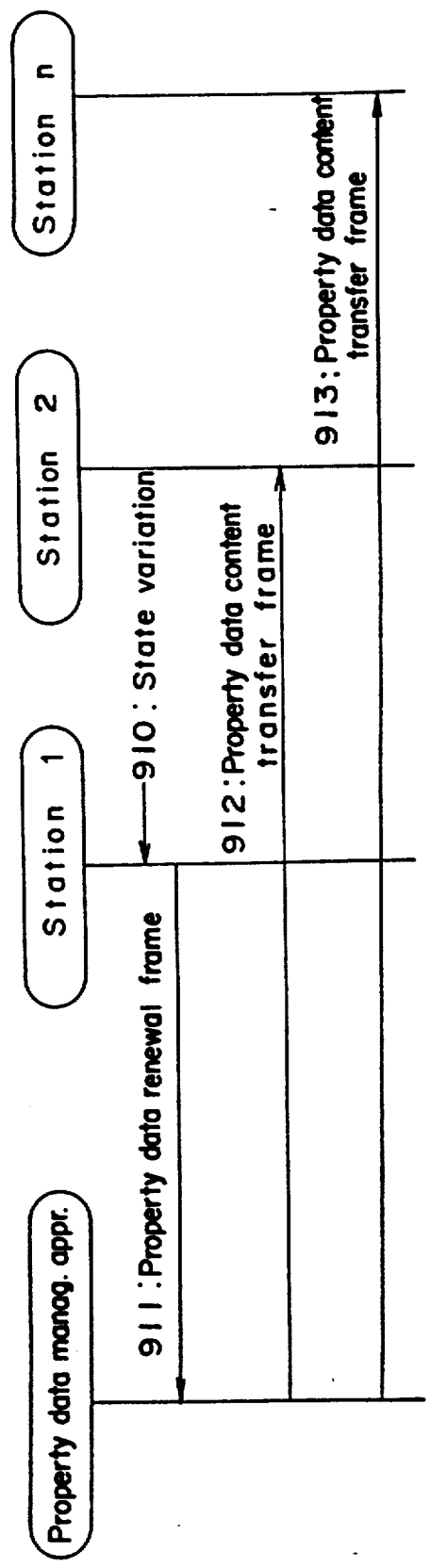
Figure 11:
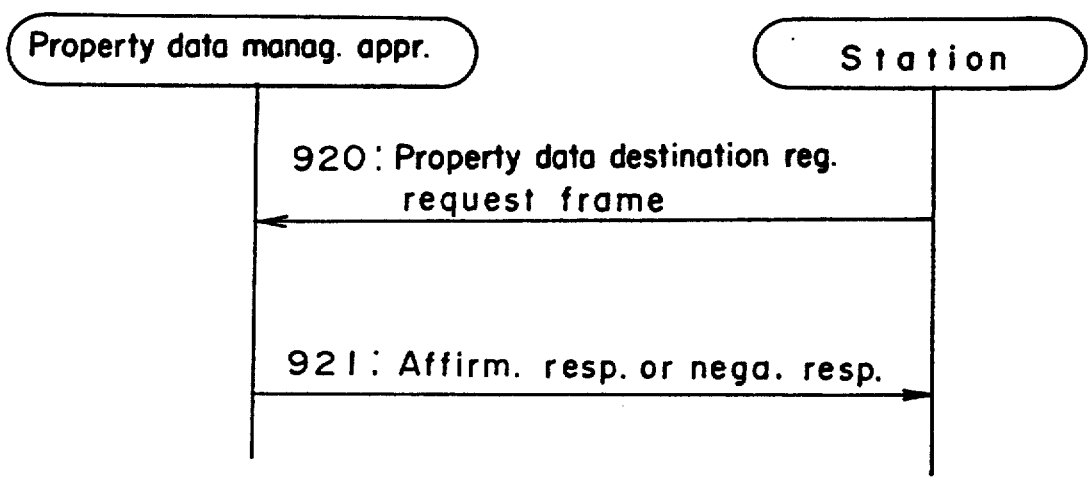
Figure 11:
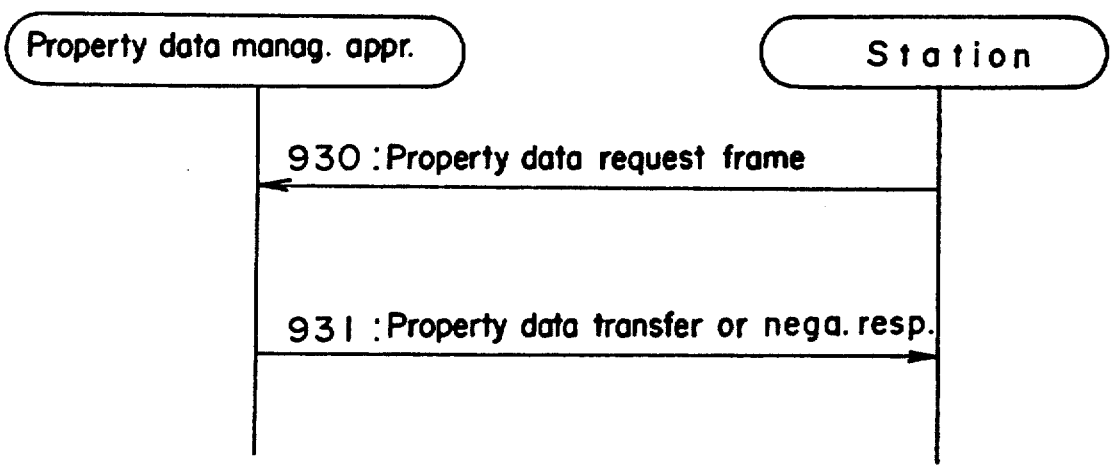

When a certain station has its internal state varied, due to an operation by an operator, etc., (as at 910 in FIG. 11(b)), it transfers a property data renewal frame 911 to the property data managing device through use of a "Renewal command" 810. In the property data managing apparatus, the processing with respect to the "Renewal command" 810 is effected by the method as described above, to thereby effect renewal of the registered property data. Thereafter, it is checked whether or not the registration for a "property data transfer wish" has been effected by the above procedure, and if such a "transfer wish" has been registered, the property data content transfer frames 912 and 913 are sent out with respect to the related stations through employment of a "Transfer command" 840, and thus, the property data content renewal sequence is completed.

(c) Property Data Transfer Destination Registration Sequence

In the case where a certain station requires the renewed property data of another station to be transferred thereto when such property data has been renewed, the station sends out the property data transfer destination registration request frame 920 (FIG. 11(c)) to the property data managing apparatus through employment of a "Transfer destination command" 820. The property data managing apparatus effects the processing for the property data transfer destination registration request frame 920 based on the procedure as described above, and returns an affirmative response frame or negative response frame 921 through employment of a "Registration completion command" 821 or "No equivalent property command" 822, to thereby complete the property data transfer destination registration sequence.

(d) Property Data Transfer Request Sequence

When a certain station wishes to obtain the property data of another station, it transfers the property data transfer frame 930 (FIG. 11(d)) to the property data managing apparatus through employment of a "Transfer request command" 830. With respect to the above, the property data managing apparatus, through employment of the above described practice, returns the response frame 931 to the requesting station through employment of a "Transfer command" 840 or "No equivalent property command" 841, and thus, the property data requesting sequence is completed.

(5) Application to Actual AV Systems

In the case where the present invention is applied to actual AV systems, the correlation between the terms employed in the description of the present invention and actual appliances or data will be briefly explained hereinbelow.

In FIG. 6 showing the general configuration of the information communication system according to the present invention, the stations 2010 to 2030 correspond to audio/video appliances such as TV sets, CD players, amplifiers, etc. in the AV system. It should be noted here, however, that, for the application of the present invention thereto, the communication processing sections 2011 to 2031 must be incorporated in the general AV appliances to import communication functions thereto. It should also be noted here that the property data processing section 2034 may be incorporated in the AV appliance referred to earlier, or that with an AV controller (personal computer or the like) for controlling the entire AV system being applied to the station 2030, the AV controller may be provided with property data processing functions.

According to the present invention, the term "property data" represents, for example, the "power supply on/off state" of the respective AV appliances, the "channel numbers for a TV set, the "functioning state" (step/play/Fast forward winding, etc.) of a video tape recorder, counter data, built-in time data, etc.

The property data which is subjected to the property data registration procedure by the first property data managing method according to the present invention includes, for example, the time data of a clock incorporated in a video tape recorder or the like. In this case, since the data is renewed once in a second, the video tape recorder having the incorporated clock effects transfer to the property data managing device (the AV appliance or AV controller incorporated with the property data processing section 2034) the the property data (time data) renewal frame. The appliance which desires the time data for reference (e.g. a TV set) requires the property data managing apparatus to transfer the latest data each time through employment of the property data transfer request frame.

The property data to be dealt with by the second property data managing method according to the present invention also includes the time data and the like referred to earlier. In this case, in contrast to the first property data managing method, the TV set, audio tuner, etc., are preliminarily registered as a "transfer wish", and the property data managing apparatus, for example, transfers the latest time data to the TV set and audio tuner immediately upon receipt of the renewed time data from the video tape recorder once per one second, whereby even a TV set incorporated with no clock can display time on the image screen.

It is to be noted here that, in the foregoing description, although the time data has been taken up by way of example, for explanation, the property data to be registered may be of any contents, and such property data frequently referred to by other appliances, or property data simultaneously referred to by many appliances, and especially property data which may be altered at any time, can be effectively dealt with by the present invention.

By adopting the property data managing methods according to the present invention as described so far, the effects as follows may be obtained.

(1) Through employment of the first property data managing method according to the present invention, the following effects are available.

Since it is so arranged that the property data which each station wishes to manage is registered in the property data managing apparatus for renewal of the content of the property data as needed, the property data may be concentratedly managed at the one place of the property data managing apparatus. Accordingly, the station having the property data which may possibly be frequently referred to by other stations can leave the reference processing to the property data managing apparatus by preliminarily registering the associated property data in the managing apparatus, and therefore, a marked reduction in the processing amount may be expected in each station.

Meanwhile, in the stations for referring to the property data, it becomes possible to send out the property data transfer request to the same station (property data managing apparatus) at all times, and thus, the program for the property data reference processing may be simplified.

(2) The effects to be obtained by the employment of the second property data managing method according to the present invention are as follows.

In addition to the effects available by the first property data managing method of the present invention as described so far, in the second property data managing method, since the station which desires property data transfer preliminarily registers the transfer destination with respect to the property data to be transferred, to thereby transfer the property data to the registered station each time the property data has been renewed, the station may detect the renewal of the property data content without effecting property data collecting processing by polling. Moreover, according to the present invention, the processing equivalent to the same report function conventionally effected by the simultaneous same report frame can be realized without employment of such a simultaneous same report frame having a low reliability.

Although the present invention has been fully described by was of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A data management method for controlling the transfer of data in an information communication system in which a plurality of stations are operatively coupled to a same information transmission path and in which frames of data are transmitted among the plurality of stations on the information transmission path, each frame of data including a command region and a relevant data region, said method comprising:
   a step of analyzing at a receiving station a command region of a frame transmitted by a sending station on said information transmission path to determine if said command region denotes one of a data registration command, a data renewal command or a data transfer command;
   a step of storing in a data memory of said receiving station the relevant data contained in said frame when said command region denotes the data registration command;
   a step of overwriting previously stored relevant data of said sending station stored in said data memory of said receiving station with said relevant data contained in said frame when said command region denotes the data renewal command; and
   a step of transmitting relevant data contents, specified in said frame of data, of said data memory of said receiving station on said information transmission path when said command region denotes the data transfer command.

2. A data management method for controlling the transfer of data in an information communication system in which a plurality of stations are operatively coupled to a same information transmission path and in which frames of data are transmitted among the plurality of stations on the information transmission path, each frame of data including a command region and a relevant data region, said method comprising:
   a step of analyzing in a receiving station a command region of a frame transmitted by a sending station on said information transmission path to determine if said command region denotes one of a data registration command, a destination address registration command, a data renewal command or a data transfer command;
   a step of storing in a data memory of said receiving station the relevant data contained in said frame when said command region denotes the data registration command;
   a step of storing in said data memory of said receiving station a destination address contained in said frame when said command region denotes the destination address registration command, the thus stored destination address being associated with relevant data of said sending station stored in said data memory of said receiving station;
   a step of, when said command region denotes the data renewal command, overwriting previously stored relevant data of said sending station stored in said data memory of said receiving station with said relevant data contained in said frame to obtain stored renewed relevant data, determining if said previously stored relevant data have a destination address associated therewith, and transmitting said renewed relevant data to a station identified by said destination address when said previously stored relevant data have said destination address associated therewith; and
   a step of transmitting relevant data contents, specified in said frame of data, of said data memory of said receiving station on said information transmission path when said command region denotes the data transfer command.

3. A data management method for controlling the transfer of data in an information communication system having a plurality of stations operatively coupled to a same data transmission path, said method comprising:
   storing respective inherent data in a data memory of each of said plurality of stations;
   selectively operating said plurality of stations in one of a master mode and a slave mode;
   said master mode including,
   (a) transmitting a frame of data on said data communication path, said frame of data including at least a slave address region designating one of said plurality of stations to operate in said slave mode and a command region designating processes to be carried by said one of said plurality of stations designated to operate in said slave mode, said frame of data further including inherent data when said inherent data is to be stored in said one of said plurality of stations designated to operate in said slave mode, and (b) receiving data transmitted on said data communication path from said one of said plurality of stations designated to operate in said slave mode;

said slave mode including,
- (a) receiving said frame of data transmitted on said data communication path by a one of said plurality of stations operating in said master mode,
- (b) analyzing said command region of said frame of data transmitted on said data transmission path to determine if said command region denotes one of a data registration command, a data renewal command or a data transfer command;
- (c) storing in said data memory the inherent data contained in said frame of data when said command region denotes the data registration command,
- (d) overwriting previously stored inherent data contents of said data memory with said inherent data contained in said frame of data when said command region denotes the data renewal command, said previously stored inherent data contents associated with said one of said stations operating in said master mode, and
- (e) transmitting inherent data contents, specified in said frame of data, of said data memory on said data transmission path to said one of said plurality of stations operating in said master mode when said command region denotes the data transfer command.

4. A data management method for controlling the transfer of data in an information communication system having a plurality of stations operatively coupled to a same data transmission path, said method comprising:

storing respective inherent data in a data memory of each of said plurality of stations;

selectively operating said plurality of stations in one of a master mode and a slave mode;

said master mode including,
- (a) transmitting a frame of data on said data communication path, said frame of data including at least a slave address region designating one of said plurality of stations to operate in said slave mode and a command region designating processes to be carried by said one of said plurality of stations designated to operate in said slave mode, said frame of data further including inherent data when said inherent data is to be stored in said one of said plurality of stations designated to operate in said slave mode, and
- (b) receiving data transmitted on said data communication path from said one of said plurality of stations designated to operate in said slave mode;

said slave mode including,
- (a) receiving said frame of data transmitted on said data communication path by a one of said plurality of stations operating in said master mode,
- (b) analyzing the command region of said frame of data transmitted on said data transmission path to determine if said command region denotes one of data registration command, a destination address registration command, a data renewal command or a data transfer command,
- (c) storing in said data memory the inherent data contained in said frame of data when said command region denotes the data registration command,
- (d) storing in said data memory a destination address contained in said frame of data when said command region denotes the destination address registration command, the thus stored destination address being associated with inherent data stored in said data memory,
- (e) when said command region denotes the data renewal command, overwriting previously stored inherent data contents of said data memory with said inherent data contained in said frame of data to obtain stored renewed inherent data, said previously stored inherent data contents associated with said one of said plurality of stations operating in said master mode, determining if said previously stored inherent data contents have a destination address associated therewith, and transmitting said renewed inherent data to a station identified by said destination address when said previously stored inherent data contents have said destination address associated therewith, and,
- (f) transmitting inherent data contents, specified in said frame of data, of said data memory on said data transmission path when said command region denotes the data transfer command.

* * * * *